(12) United States Patent
Krywitsky

(10) Patent No.: US 8,225,809 B2
(45) Date of Patent: Jul. 24, 2012

(54) METHODS AND APPARATUS FOR INTRODUCING A PIG INTO A FLUID SYSTEM

(75) Inventor: Lee A. Krywitsky, Calgary (CA)

(73) Assignee: Hiltap Fittings, Ltd. (CA)

( * ) Notice: Subject to any disclaimer, the term of this patent is extended or adjusted under 35 U.S.C. 154(b) by 1057 days.

(21) Appl. No.: 12/038,971

(22) Filed: Feb. 28, 2008

(65) Prior Publication Data
US 2008/0202594 A1 Aug. 28, 2008

Related U.S. Application Data

(63) Continuation-in-part of application No. 11/769,560, filed on Jun. 27, 2007, now Pat. No. 7,909,365, which is a continuation-in-part of application No. 11/465,570, filed on Aug. 18, 2006, now Pat. No. 7,878,219, which is a continuation-in-part of application No. 10/164,945, filed on Jun. 7, 2002, now Pat. No. 7,152,630, which is a continuation-in-part of application No. 09/628,075, filed on Jul. 28, 2000, now Pat. No. 6,672,327.

(51) Int. Cl.
*B08B 9/055* (2006.01)
*F16L 25/00* (2006.01)
*F16L 55/115* (2006.01)
*F16L 57/00* (2006.01)

(52) U.S. Cl. .................. 137/15.07; 15/104.062; 285/85; 285/901; 138/89; 138/96 R

(58) Field of Classification Search .................... 138/89, 138/96 R; 285/81, 82, 84, 85, 91, 901; 15/104.61, 15/104.62; 137/15.07
See application file for complete search history.

(56) References Cited

U.S. PATENT DOCUMENTS

| 179,947 A | 7/1876 | O'Neil |
| 554,666 A * | 2/1896 | Feltner .............................. 285/85 |
| 641,028 A | 1/1900 | Meehan |

(Continued)

FOREIGN PATENT DOCUMENTS

CA 2354467 1/2002

(Continued)

OTHER PUBLICATIONS

U.S. Appl. No. 11/769,560, filed Jun. 27, 2007, Krywitsky.

(Continued)

*Primary Examiner* — John Rivell
(74) *Attorney, Agent, or Firm* — Workman Nydegger

(57) ABSTRACT

A method and apparatus for introducing a pig into a fluid system is provided. The method comprises providing a coupling in a fluid system. The coupling itself can include a sleeve coupled to a pipe and an end cap. The end cap may include a collar handle and at least one engagement member. The engagement member facilitates selective engagement of the end cap with the sleeve. The end cap is rotated relative to the sleeve to disengage the engagement member from the groove and to open the end cap relative to the sleeve. The groove is configured so that the engagement member can be opened only when the line is de-pressurized. A pig is inserted through the sleeve and into the pipe. The end cap is then coupled to the sleeve by engaging the engagement member with the sleeve and rotating the end cap relative to the sleeve.

17 Claims, 17 Drawing Sheets

U.S. PATENT DOCUMENTS

| | | | |
|---|---|---|---|
| 808,446 A | 12/1905 | Gill | |
| 836,457 A | 11/1906 | Pellar | |
| 923,545 A | 6/1909 | Madison | |
| 1,021,203 A | 3/1912 | Matchette | |
| 1,128,634 A | 2/1915 | Talbot | |
| 1,164,197 A | 12/1915 | Kildear | |
| 1,486,712 A | 3/1924 | Williams | |
| 1,576,698 A * | 3/1926 | Williams | 285/85 |
| 1,968,075 A | 7/1934 | Ewald | |
| 2,333,496 A | 11/1943 | Townhill et al. | |
| 2,340,965 A | 2/1944 | Kiesel | |
| 2,512,041 A | 6/1950 | Steele | |
| 2,543,590 A | 2/1951 | Swank | |
| 2,571,236 A | 10/1951 | Hamilton | |
| 2,679,407 A | 5/1954 | Badger | |
| 2,707,390 A | 5/1955 | Beretish | |
| 2,737,401 A | 3/1956 | Lindsay | |
| 3,063,080 A * | 11/1962 | Bergman et al. | 15/104.062 |
| 3,237,594 A * | 3/1966 | Weaver et al. | 15/104.062 |
| 3,454,024 A | 7/1969 | McCullough | |
| 3,474,827 A | 10/1969 | Rosell | |
| 3,542,047 A | 10/1970 | Nelson | |
| 3,583,731 A | 6/1971 | Jewell | |
| 3,664,634 A | 5/1972 | Guertin et al. | |
| 3,766,947 A | 10/1973 | Osburn | |
| 3,777,771 A | 12/1973 | De Visscher | |
| 3,821,970 A | 7/1974 | Affa | |
| 3,949,787 A | 4/1976 | Milo | |
| 3,978,708 A * | 9/1976 | Hayward | 15/104.062 |
| 4,010,633 A | 3/1977 | Hasha | |
| 4,019,371 A | 4/1977 | Chaplin et al. | |
| 4,133,347 A | 1/1979 | Mercer | |
| 4,184,516 A | 1/1980 | Oesterritter et al. | |
| 4,269,230 A | 5/1981 | Pepper | |
| 4,271,865 A | 6/1981 | Galloway et al. | |
| 4,461,065 A | 7/1984 | Futterer | |
| 4,510,969 A | 4/1985 | Rodth | |
| 4,567,924 A | 2/1986 | Brown | |
| 4,614,201 A | 9/1986 | King et al. | |
| 4,625,746 A | 12/1986 | Calvin et al. | |
| 4,643,459 A | 2/1987 | Carson | |
| 4,646,773 A | 3/1987 | Klop et al. | |
| 4,696,326 A | 9/1987 | Sturgis | |
| 4,739,799 A | 4/1988 | Carney et al. | |
| 4,815,491 A | 3/1989 | Prikle | |
| 4,827,960 A | 5/1989 | Nitzberg et al. | |
| 4,827,977 A | 5/1989 | Fink, Jr. | |
| 4,896,688 A | 1/1990 | Richards et al. | |
| 4,901,751 A | 2/1990 | Story et al. | |
| 4,909,280 A | 3/1990 | Friedrich et al. | |
| 4,909,545 A | 3/1990 | Hohol | |
| 4,926,680 A | 5/1990 | Hasha et al. | |
| 5,009,252 A | 4/1991 | Faughn | |
| 5,170,659 A | 12/1992 | Kemp | |
| 5,184,851 A | 2/1993 | Sparling | |
| 5,209,105 A | 5/1993 | Hasha et al. | |
| 5,219,244 A * | 6/1993 | Skeels | 15/104.062 |
| 5,297,574 A | 3/1994 | Healy | |
| 5,316,033 A | 5/1994 | Schumacher et al. | |
| 5,320,133 A | 6/1994 | Nimberger | |
| 5,404,909 A | 4/1995 | Hanson | |
| 5,494,074 A | 2/1996 | Ramacier et al. | |
| 5,520,418 A | 5/1996 | Burke | |
| 5,529,085 A | 6/1996 | Richards et al. | |
| 5,699,822 A | 12/1997 | Bodhaine | |
| 5,704,659 A | 1/1998 | Lunder | |
| 5,816,298 A | 10/1998 | Stricklin et al. | |
| 5,826,610 A | 10/1998 | Bodhaine | |
| 5,891,260 A | 4/1999 | Streets et al. | |
| 5,934,319 A | 8/1999 | Schumacher | |
| 6,000,278 A | 12/1999 | Hystad | |
| 6,029,701 A | 2/2000 | Chaffardon et al. | |
| 6,050,297 A | 4/2000 | Ostrowski et al. | |
| 6,082,392 A | 7/2000 | Watkins | |
| 6,106,026 A | 8/2000 | Smith | |
| 6,142,194 A | 11/2000 | McClaran | |
| 6,155,294 A | 12/2000 | Cornford et al. | |
| 6,237,631 B1 | 5/2001 | Giesler et al. | |
| 6,283,151 B1 | 9/2001 | Countryman et al. | |
| 6,325,092 B1 | 12/2001 | Pirkle | |
| 6,354,564 B1 | 3/2002 | Van Scyoc et al. | |
| 6,375,153 B2 | 4/2002 | Smith | |
| 6,511,103 B1 | 1/2003 | Defontaine | |
| 6,672,327 B1 | 1/2004 | Krywitsky | |
| 6,769,152 B1 * | 8/2004 | Crenshaw et al. | 15/104.062 |
| 6,871,804 B2 | 3/2005 | Hagihara | |
| 6,899,131 B1 | 5/2005 | Carmack et al. | |
| 6,981,513 B2 | 1/2006 | Krywitsky | |
| 7,029,581 B2 | 4/2006 | Horan | |
| 7,117,892 B2 | 10/2006 | Krywitsky | |
| 7,152,630 B2 | 12/2006 | Krywitsky | |
| 7,533,694 B2 | 5/2009 | Krywitsky | |
| 2004/0188335 A1 | 9/2004 | Horan | |
| 2006/0289062 A1 | 12/2006 | Krywitsky | |
| 2007/0039657 A1 | 2/2007 | Krywitsky | |
| 2007/0289650 A1 | 12/2007 | Krywitsky | |
| 2008/0202594 A1 | 8/2008 | Krywitsky | |

FOREIGN PATENT DOCUMENTS

DE 29609071 12/1996

OTHER PUBLICATIONS

U.S. Appl. No. 11/465,570, filed Aug. 18, 2006, Krywitsky.
OEM Mass Flowmeters, TSI Incorporated, 1998.
SIMA FC2 Induction-based flow meter, www.simaservis.cz, publication date unknown.
Non-Final Office Action dated Aug. 21, 2007, received in U.S. Appl. No. 11/465,384.
Amendment "A" filed Feb. 21, 2008, in U.S. Appl. No. 11/465,384.
Office Action dated Aug. 18, 2006, from U.S. Appl. No. 11/465,528.
Office Action dated Nov. 20, 2008 from U.S. Appl. No. 11/465,528.
SIMA FC2 Induction-based flow meter, www.simaservis.cz, publication date.
Non-Final Office Action dated Oct. 17, 2007, received in U.S. Appl. No. 11/465,528.
Office Action from U.S. Appl. No. 11/465,528, dated Aug. 18, 2006, 8 pages.
Office Action from U.S. Appl. No. 11/465,528, dated Nov. 20, 2008, 8 pages.
International Search Report from PCT/IB2004/003833, dated Apr. 6, 2005, 2 pages.
Written Opinion from PCT/IB2004/003833, dated May 2, 2005, 5 pages.
International Preliminary Report on Patentability from PCT/IB2004/003833, dated Apr. 24, 2006, 6 pages.
Supplemental European Search Report from EP Application No. 04817295.1 dated May 4, 2010 (Copy Attached).
Examination Report from EP Application No. 04817295.1 dated Aug. 23, 2010 (Copy Attached).
U.S. Appl. No. 10/140,276, mailed Jun. 23, 2004, Office Action.
U.S. Appl. No. 10/140,276, mailed Mar. 11, 2005, Office Action.
U.S. Appl. No. 10/140,276, mailed Jul. 14, 2005, Notice of Allowance.
U.S. Appl. No. 10/164,945, mailed Apr. 15, 2005, Office Action.
U.S. Appl. No. 10/164,945, mailed Oct. 20, 2005, Office Action.
U.S. Appl. No. 10/164,945, mailed May 26, 2006, Notice of Allowance.
U.S. Appl. No. 11/465,570, mailed Sep. 28, 2009, Notice of Allowance.
U.S. Appl. No. 11/465,570, mailed Sep. 22, 2010, Notice of Allowance.
U.S. Appl. No. 11/769,560, mailed Feb. 25, 2010, Office Action.
U.S. Appl. No. 11/769,560, mailed Nov. 15, 2010, Notice of Allowance.
U.S. Appl. No. 11/465,384, mailed May 28, 2008, Office Action.
U.S. Appl. No. 11/465,384, mailed Jan. 14, 2009, Notice of Allowance.

* cited by examiner

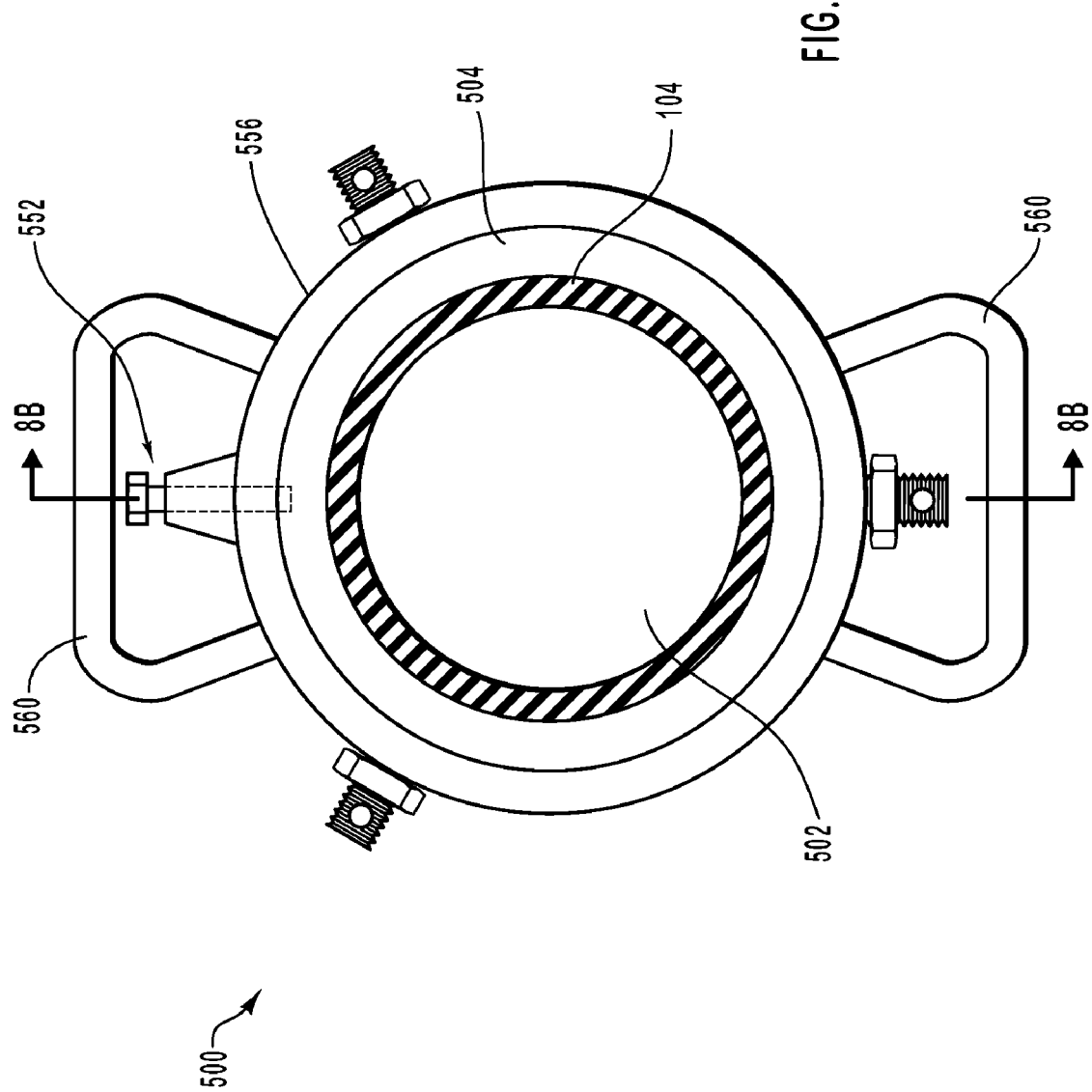

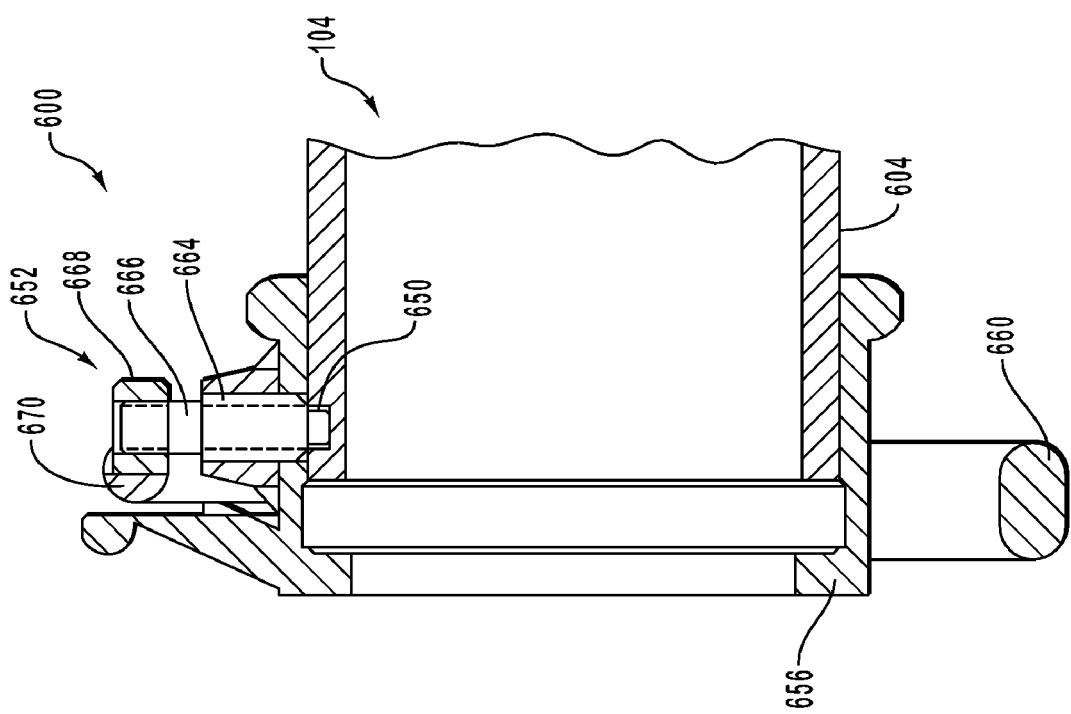

METHODS AND APPARATUS FOR INTRODUCING A PIG INTO A FLUID SYSTEM

CROSS-REFERENCE TO RELATED APPLICATIONS

This application is a continuation-in-part and claims the benefit of U.S. patent application Ser. No. 11/769,560, filed on Jun. 26, 2007, entitled FLUID SYSTEM COUPLING WITH HANDLE ACTUATING MEMBER, which is a continuation-in-part and claims the benefit of U.S. patent application Ser. No. 11/465,570, filed on Aug. 8, 2006, entitled FLUID SYSTEM COUPLING WITH PIN LOCK, which is a continuation-in-part and claims the benefit of U.S. patent application Ser. No. 10/164,945, filed on Jun. 7, 2002, entitled FLUID SYSTEM COUPLING, which is a continuation-in-part and claims the benefit of U.S. patent application Ser. No. 09/628,075, filed on Jul. 28, 2000, now U.S. Pat. No. 6,672,327, entitled DRY BREAK VALVE ASSEMBLY, all of which are incorporated herein in their entireties by this reference.

BACKGROUND

1. Technological Field

The present invention relates generally to fluid system components. More particularly, embodiments of the present invention relate to coupling elements for fluid system components, in which the coupling elements facilitate quick and efficient coupling/decoupling of the fluid system components for the introduction of a fluid system cleaning device. Further, embodiments of the present invention relate to fluid system components which substantially prevent inadvertent, unintentional and/or undesired removal of a coupling element until the fluid system line pressure, or relative pressure differential, is reduced to a safe level.

2. Related Technology

Pipes used in fluid systems, such as those found at chemical plants, oil refineries, power generation plants, mines, paint manufacturing, lubricant blending, steel mills, pulp and paper plants, water filtration, sewage treatment plants, food processing, and the like, often carry contaminants that become deposited on the inside of the pipes. These contaminants can be extremely hard, such as coke, calcium, silica, sulfur, iron sulfides and types of ceramic. Build up of these contaminants can cause a variety of problems from reduced production to rupture of the pipe.

Various methods have been used to clean the inside of pipes. For example, some exemplary methods include steel shot blasting, high pressure water blasting and chemical cleaning. Notably, in each of these methods, at least some of the deposited contaminants are removed from the walls of the pipe. While effective for removal of such contaminants, however, such methods may also not effect complete removal (or as complete removal as is desired) and/or can increase pipe erosion and sagging, present fire hazards and/or environmental concerns, require long shut down periods, thereby also resulting in high cost and decreased production run lengths.

Accordingly, other methods for cleaning the inside of pipes have been developed. Once such method include the use of cleaning devices generally known as pigs. Pigs are available in a wide variety, and can include, for example, mandrel pigs, foam pigs, solid cast pigs, spherical pigs, geometry pigs, and gel pigs. Any such pig may be shaped to substantially conform to the interior of the pipes and can be propelled through the pipes to clean the interior of the pipes. In some cases, the pig can have appendages, such as brushes, disposed circumferentially around and extending radially outward from the body of the pig. As such, a pig is forced through the pipe—by using hydraulic pressure for example—and the appendages remove the contaminants from the inside of the pipe. Pigs may also be used for other purposes other than cleaning. For instance, pigs may be used to separate dissimilar products, dewater a pipe, provide information on the condition inside the pipe (including the extent, nature and location of any problems), and to dry the inside of a pipe.

For whatever purpose the pig is used, the pig is typically introduced into a fluid system pipe through a flange. Removing and replacing a flange can require significant time. A typical flange, for instance, will be secured to the end of a pipe with several studs/bolts and nuts. For example, to disengage an ANSI 300# flanges, an operator must undo twelve studs with two nuts per stud. Once the flange has been disengaged and the pig has been inserted into the pipe, the operator must then couple the flange to the end of the pipe by tightening the twenty-four nuts back onto the twelve studs. Due to the delays in disengaging such flanges, such pigging systems can therefore also result in shut down times that are longer than desired, and increase the overall costs while reducing production run lengths.

Moreover, introducing a pig into a pipe through a typical flange may also pose significant safety and/or environmental risks. For instance, typical flanges are configured so that an operator can uncouple the bolts of the flanges even in the presence of line pressure.

In the event the line wherein the flange is located is charged with hazardous materials (e.g., chemicals, sewage, fuels, or gases such as chlorine and methane) the operator performing the uncoupling operation could be seriously injured or killed when such materials escape from the line, and possibly at a very high velocity. Moreover, such hazardous materials may include pollutants, and significant time and cost is often involved in the cleanup of such materials.

A related feature of such typical flanges concerns the pressure exerted by the material in the line wherein the flange is located. In particular, such pressure may cause the flange to rapidly separate from the pipe in an uncontrolled and dangerous manner, thereby injuring the operator and/or damaging nearby equipment. The forces resulting from such pressure can often be significant, even where the line pressure is relatively low. Thus, in a six inch diameter (nominal) pipe for example, even a relatively low pressure of ten psi) would exert a force of about one thousand pounds on a flange attached to the end of the pipe.

Not only are such pressures potentially dangerous, but operators may not have any way to verify, in advance of performing the uncoupling operation, whether or not the line is pressurized. Further, even if a mechanism exists for informing the operator whether line pressure is present, it may require a high degree of vigilance on the part of the operator and/or the operator may, through inattentiveness, negligence, or for other reasons, nevertheless attempt to uncouple the flange from the pipe.

In view of the foregoing, it is therefore desirable to have a fluid system component that facilitates the secure engagement, and ready disengagement, of mating halves of the fluid system component. Such a component can, for example, facilitate quick and convenient insertion or removal of a pig from a fluid system pipe, while at the same time optionally preventing intentional or accidental disengagement of the mating halves when a predetermined pressure is present in the line.

BRIEF SUMMARY

In general, embodiments of the invention are concerned with a fluid system component that, among other things, facilitates the secure engagement, and ready disengagement, of mating halves of the fluid system component to facilitate convenient and ready introduction and removal of a fluid system cleaning device, while at the same time preventing intentional or accidental disengagement of the mating halves when a predetermined pressure is present in the line.

In one exemplary embodiment of the invention, a method for introducing a fluid system device, such as a cleaning pig, into a pipe includes providing a coupling. The coupling itself can include a sleeve coupled to a pipe and an end cap. The end cap can include a collar handle and at least one engagement member that facilitate selective engagement of the end cap with the sleeve. The end cap is rotated relative to the sleeve, in a first direction, thereby disengaging the engagement from the groove. Disengagement of the engagement member from the groove can also disengage the end cap from the sleeve and/or open the pipe. The sleeve and end cap can be configured such that the engagement member fully disengages from the groove only when the pipe has a pressure below a certain level, and such that at or above that level, the engagement member is substantially prevented from fully disengaging from the groove. Once the pipe is opened, a fluid system device, such as a pig, can be inserted through the sleeve into the pipe. The end cap is then coupled to the sleeve by positioning the engagement member within the groove and rotating the end cap relative to the sleeve, and in a second direction that is opposite the first direction.

Optionally, the coupling includes a locking mechanism that prevents axial rotation of the end cap relative to the sleeve. Such a locking mechanism can include a pin that extends through an aperture in the end cap and/or is received within a recess in the sleeve. The pin and/or locking mechanism may also include a pin handle that facilitates retraction of the pin from the recess in the sleeve, and such pin handle may be configured to enable a user to selectively move the pin handle while the user simultaneously grips the collar handle with the same hand. The groove in the sleeve can be formed in an outer surface thereof, and can include an entry segment, a circumferential segment, and/or a terminal segment. In one example, the terminal segment is connected to the intermediate segment and is offset therefrom at an acute angle. The terminal segment may thus be adapted to receive an engagement member and prevent axial rotation of the end cap relative to the sleeve.

According to another embodiment, a method for introducing a pig into a pipe includes providing a coupling that includes a coupling member, a fluid conduit, and a locking member. The coupling member includes an engagement member and the fluid conduit has a sleeve defining a groove. The sleeve is configured to be received at least partially by the coupling member. Additionally, the groove extends at least partially around the circumference of the sleeve and has a terminal portion notched in the side of the groove. The groove itself is adapted to receive the engagement member and facilitate engagement of the coupling member with the sleeve, and such that the terminal portion, when it receives the engagement member under line pressure, substantially prevents the coupling member from rotating relative to the fluid conduit. The locking member is movably connected to the coupling member and is adapted to engage the sleeve and prevent axial rotation of the coupling member relative to the sleeve.

The locking member can be disengaged from the sleeve and the coupling member can be rotated axially relative to the sleeve to fully disengage the engagement member from the sleeve, although when line pressure is above a predetermined amount, it substantially locks the engagement member in the terminal segment to prevent full disengagement. When disengagement occurs, a pig can then be inserted into the fluid conduit and the coupling member can be engaged with the sleeve by positioning the engagement member in the groove and rotating the coupling member until the engagement member is positioned within, adjacent, or beyond the terminal segment. The locking member can then be engaged with the sleeve to selectively secure the coupling member to the sleeve.

Any suitable coupling member may be used. For instance, the coupling member may be an end cap, a portion of a valve, or another coupling member. In another case, the coupling member includes a second fluid conduit for introducing a pressurized fluid into the first fluid conduit. For instance, the second fluid conduit can be a hose that allows air or another fluid to flow into the first fluid conduit in a direction that is opposite the line pressure. Such fluid may, for example, force the pig in a direction opposite the line pressure to, for example, clean, dewater, dry or inspect the pipe.

In another embodiment, a fluid system is described and includes a coupling adapted for mounting to a fluid conduit. The coupling can include an engagement member and a locking member, and can have multiple positions relative to the fluid conduit. For instance, in a first locked position, the engagement member can be received within a circumferential segment of a groove in the fluid conduit while the locking mechanism is received within the terminal segment of the groove. In this manner, the locking mechanism can substantially prevent rotation of the coupling relative to the fluid conduit. In a second locking position, the engagement member can be received within the terminal segment while the locking member is retracted from the groove, such that the engagement member substantially prevents rotation of the coupling relative to the fluid conduit. Additionally, the coupling may be adapted to rotate from the first locked position to a second locked position when the locking member is retracted from the groove and when line pressure exists in the fluid conduit. Such a fluid system may further include a pig, including a chemical, mechanical or gelled pig.

In another exemplary embodiment of the invention, a method of introducing a pig into a fluid system is provided that includes uncoupling a male portion of a fluid system component from a female portion, the insertion of a pig into the fluid system pipe, and the re-coupling of the male portion to the female portion of the fluid system component. The male portion of the fluid system component can include a wall having an outer surface on which one or a plurality of grooves are formed. The grooves are generally configured so that each of a plurality of rollers present on an inner surface of a wall of the female portion of the fluid system component enters, and travels along, a corresponding groove as the male and female portions are rotatably engaged together.

Further, the grooves defined in the male portion of the fluid system component can angled with respect to the longitudinal axis of the fluid system component, so that the male and female portions advance toward each other as they are rotatably engaged. Each of the grooves also can include a terminal segment that is connected to, but offset from, an entry segment and/or a circumferential segment of the groove.

An exemplary embodiment of the present invention further provides a locking mechanism on the fluid system component that substantially prevents takedown of the fluid system component as a result of unintentional or accidental rotation of the fluid system components. The locking mechanism includes a locking pin that extends through the wall of a first portion of the fluid system component and into a recess defined in the outer wall of a second portion of the fluid system component. The locking pin is movably connected to the first of the fluid system component and may be biased so that a distal end of the locking pin protrudes from the inner wall of the first portion of the fluid system component to engage the recess in the second portion of the fluid system component. The engagement between the locking pin and the recess in the second portion of the fluid system component prevents relative rotation of the first and second portions of the fluid system component, and thus takedown of the fluid system component.

An exemplary locking mechanism of the fluid system component further includes a pin handle at or near the proximate end of the locking pin. The pin handle allows a user to withdraw the distal end of the locking pin from a recess in the second portion of the fluid system component. Once the locking pin is disengaged from the recess in the second portion of the fluid system component, the portions of the fluid system component can be rotated relative to each other so that they can be disengaged from each other.

A collar handle can also be formed on the outer wall of the first portion of the fluid system component. The collar handle can facilitate movement and manipulation of the fluid system component, such as rotation of the first portion relative to the second portion of the fluid system component. The collar handle is, in one example, adjacent to the pin handle, which is on or near the proximate end of the locking pin. Such placement of the collar handle and the pin handle allows a user to simultaneously hold both handles. While simultaneously holding both handles, a user can withdraw the pin and rotate the first portion into engagement with the second portion of the fluid system component. Thereafter, the user can release the pin handle to engage the locking pin within the recess defined in the second portion without having to let go of the collar handle with either hand.

An exemplary embodiment of a method of the present invention comprises the uncoupling of the first portion of the fluid system component from the second portion of the fluid system component, the insertion of a pig into a fluid system pipe, and the re-coupling of the first portion of the fluid system component to the second portion of the fluid system component. The first portion of the fluid system component can be uncoupled from the second portion of the fluid system component by disengaging the locking mechanism, which is accomplished by withdrawing the locking pin from the recess in the second portion of the fluid system component. Rollers of the first portion can then be disengaged from terminal segments of the second portion's grooves, thereby allowing the first and second halves of the fluid system component to rotate axially relative to one another. The first and second halves of the fluid system component are then rotated until the rollers exit the grooves. With the first and second halves of the fluid system component disengaged, a pig can be introduced into the interior of the fluid system pipe. The first and second halves of the fluid system component can then be re-coupled by withdrawing the locking pin from within the interior of the first portion and moving the first portion such that the rollers are positioned within the entry segments of the grooves of the second portion. The first portion can then be rotated such that the rollers proceed through the entry and circumferential segments and come to rest in the terminal segments of the grooves.

These and other aspects of embodiments of the present invention will become more fully apparent from the following description and appended claims.

BRIEF DESCRIPTION OF THE DRAWINGS

A more particular description of various aspects of the embodiments of the invention illustrated in the appended drawings will now be rendered. Understanding that such drawings depict only exemplary embodiments of the invention, and are not therefore to be considered limiting of the scope of the invention in any way, various features of such exemplary embodiments will be described and explained with additional specificity and detail through the use of the accompanying drawings in which:

FIG. 8A is an end view of yet another embodiment of a coupling which includes an end cap and a sleeve that can be releasably connected to each other and which can optionally be used to introduce a pig into the fluid system such as that of FIGS. 1 and 7;

FIG. 9B is a cross-sectional side view of the coupling of FIG. 9A; and

DETAILED DESCRIPTION OF EXAMPLE EMBODIMENTS

Reference will now be made to the figures wherein like structures will be provided with like reference designations. It is to be understood that the drawings are diagrammatic and schematic representations of various embodiments of the invention, and are not to be construed as limiting the present invention, nor are the drawings necessarily drawn to scale.

Figure 1:
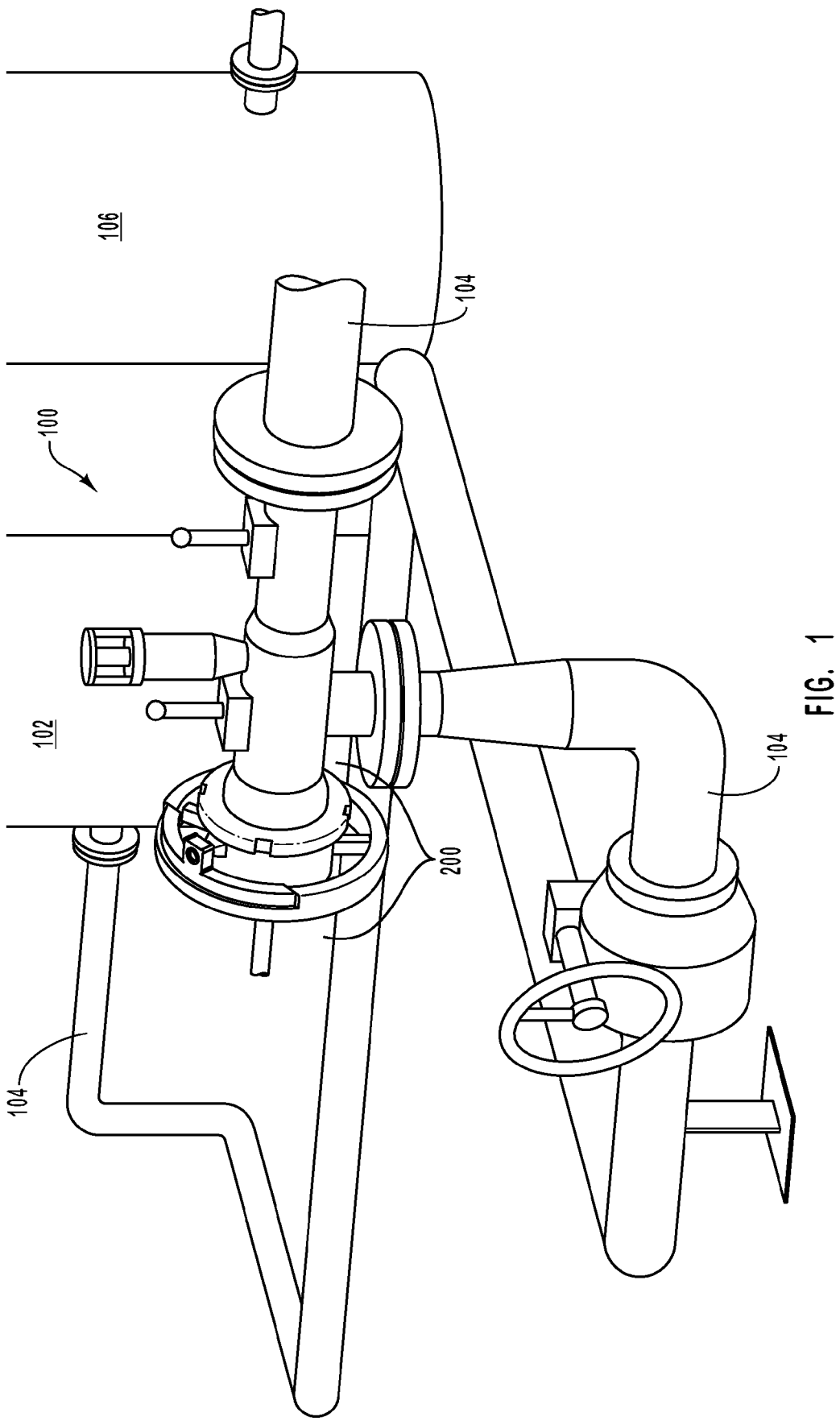
FIG. 1 depicts an exemplary fluid system for at least some embodiments of the present invention.

With reference first to FIG. 1, a portion of one embodiment of a fluid system is indicated generally at 100. Note that, as contemplated herein, "fluid" is not limited to liquids, but can include a variety of other compositions. For example, the term "fluid," as used herein, expressly includes liquids, gases, liquid-gas combinations, slurries, liquid-solid combinations, gas-solid combinations, and liquid-solid-gas combinations. In the exemplary embodiment depicted in FIG. 1, fluid system 100 includes a fluid source 102 in fluid communication with one or more fluid conduits 104. According to some example embodiments at least one of fluid conduits 104 may comprise a coupling 200, which may be configured to enable quick and convenient installation and removal of coupling 200 from one or more fluid conduits. For example, in one embodiment, coupling 200 is a pig coupling that allows the introduction of a fluid system cleaning, inspection or separation device (such as pigs 300, 310 and 320 illustrated in FIGS. 5A-5C) into fluid conduit 104. Fluid conduits 104 are, in the illustrated embodiment, configured for selective fluid communication between fluid source 102 and fluid destination 106.

As discussed elsewhere herein, it will be appreciated that pig coupling 200 may be located, either in part or in its entirety, at fluid source 102, at fluid destination 106, or at an intermediate position between fluid source 102 and fluid destination 106. It will also be appreciated that the term "conduit" can include any structure or device adapted to facilitate transportation of a fluid, wherein such structures and devices include, but are not limited to, pipes, hoses, tubes, channels, ducts, or the like. Furthermore, fluid conduits 104, fluid source 102 and fluid destination 106 may be constructed of one or a combination of any of a variety of materials, including, but not limited to, metals, plastics, rubbers, composites, organic materials, and the like.

With continuing reference to FIG. 1, fluid source 102 and fluid destination 106 are illustrated as aboveground tanks. However it will be appreciated that fluid source 102 and/or fluid destination 106, may comprise any of a variety of different static or mobile structures and/or vehicles. Such structures and vehicles include, but are not limited to, air, water, or land vehicles, such as, but not limited to, trucks, boats, automobiles, motorcycles, ships, railcars, aircraft, and the like, as well as structures such as tanks, reservoirs, and the like.

In operation of fluid system 100, a pressure differential can be established between fluid source 102 and fluid destination 106 so as to cause flow of the fluid through fluid conduits 104 in a desired direction. It will be appreciated that the pressure differential may be established in such a way as to cause flow to proceed in one or more directions, such that fluid may flow from fluid source 102 towards fluid destination 106 and/or from fluid destination 106 towards fluid source 102. The pressure differential may result from the force of gravity, or may alternatively be established by various types of equipment and devices including, but not limited to, pumps and the like.

After fluid has been communicated between fluid source 102 and fluid destination 106 through fluid conduits 104, residual fluid may remain in fluid conduit 104. In some fluid systems, it may be desirable to remove the residual fluid from fluid conduits 104 to prevent buildup of material on the interior surfaces of fluid conduits 104, for example. It may also be desirable to remove residual fluid from fluid conduits 104 prior to the introduction of another fluid into fluid conduits 104. In other embodiments, it may be desirable to separate batches of different types of fluids within fluid system 100 and/or inspect the internal workings of fluid conduits 104.

Figure 2:
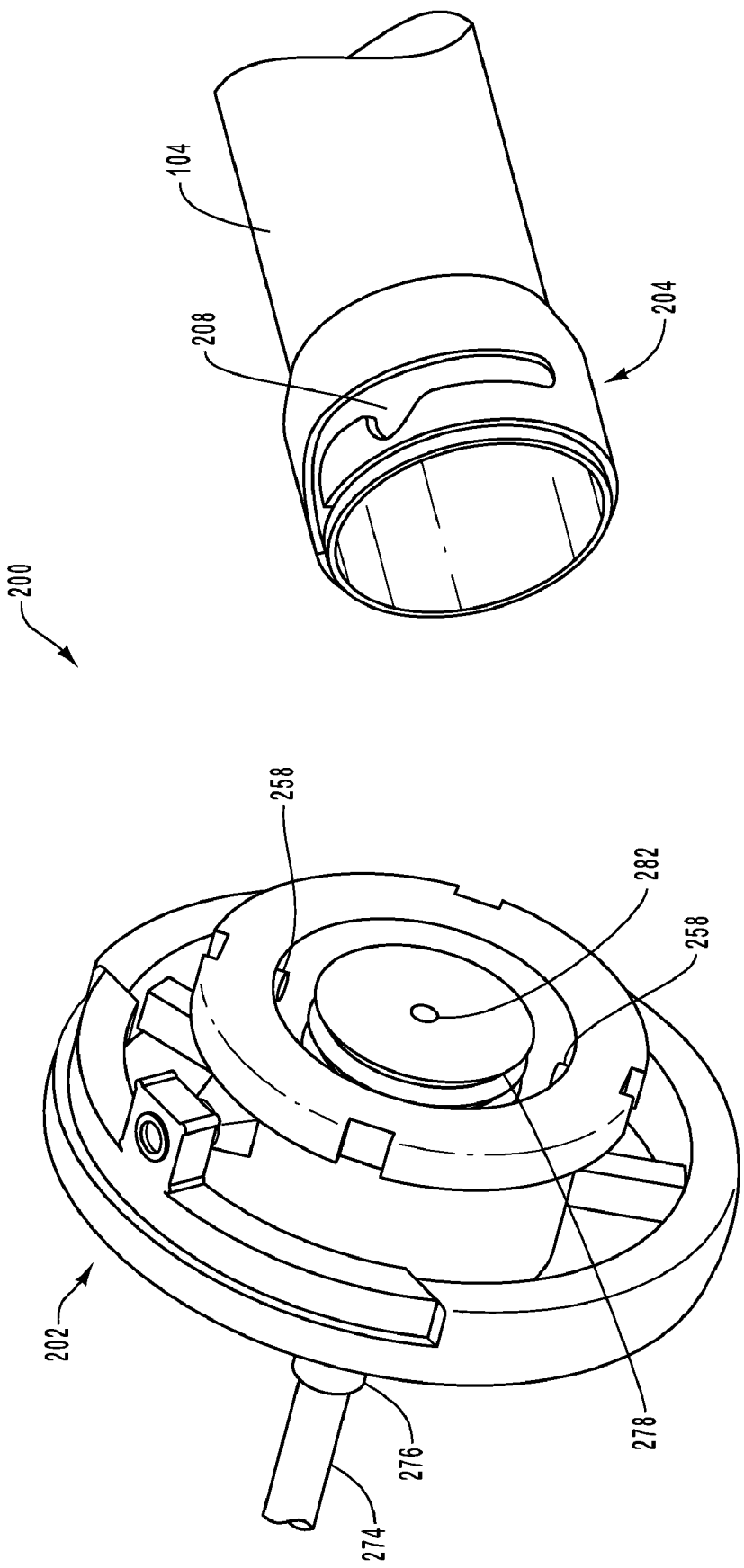
FIG. 2 is a perspective view of an embodiment of a coupling which includes an end cap and a sleeve that can be releasably connected to each other and which can be used to introduce a pig into a fluid system such as that of FIG. 1.

Directing attention now to FIGS. 2-4C, details are provided concerning exemplary embodiments of a pig coupling, generally denoted at 200, which facilitates ready and convenient access to the interior of fluid conduits 104 to enable removal of residual fluid from and the cleaning of fluid conduits 104 between fluid source 102 and fluid destination 106. As illustrated in FIG. 2, for example, pig coupling 200 includes a sleeve 204 that is configured to receive one end of fluid conduit 104 and at least partially define a fluid passageway. In this example, pig coupling 200 also includes an end cap 202 configured to be positioned on sleeve 204, and which at least partially defines the fluid passageway in connection with fluid conduit 104. End cap 202 and sleeve 204 can collectively allow for quick and convenient access to the interior of fluid conduit 104 for insertion or removal of a pig 300 (see FIGS. 5A, 6 and 7) from fluid conduit 104. Additionally, end cap 202 optionally includes another fluid conduit 274 connected thereto, and which can introduce pressurized fluid, such as air, into fluid conduit 104. For example, fluid conduit 274 can be an air hose which allows pressurized air to pass through coupling 200, from end cap 202 towards sleeve 204, and thus in a direction opposite the pressure of other fluid from sleeve 204 and against end cap 202. Such air or other fluid can, in turn, thereby facilitate movement of pig 300 through fluid conduit 104 and towards fluid destination 106 (see FIG. 1) or towards another desired location. Finally, end cap 202 and sleeve 204 can include various features which substantially prevent fluid leakage and/or undesirable take down of fluid system 100.

Figure 4A:
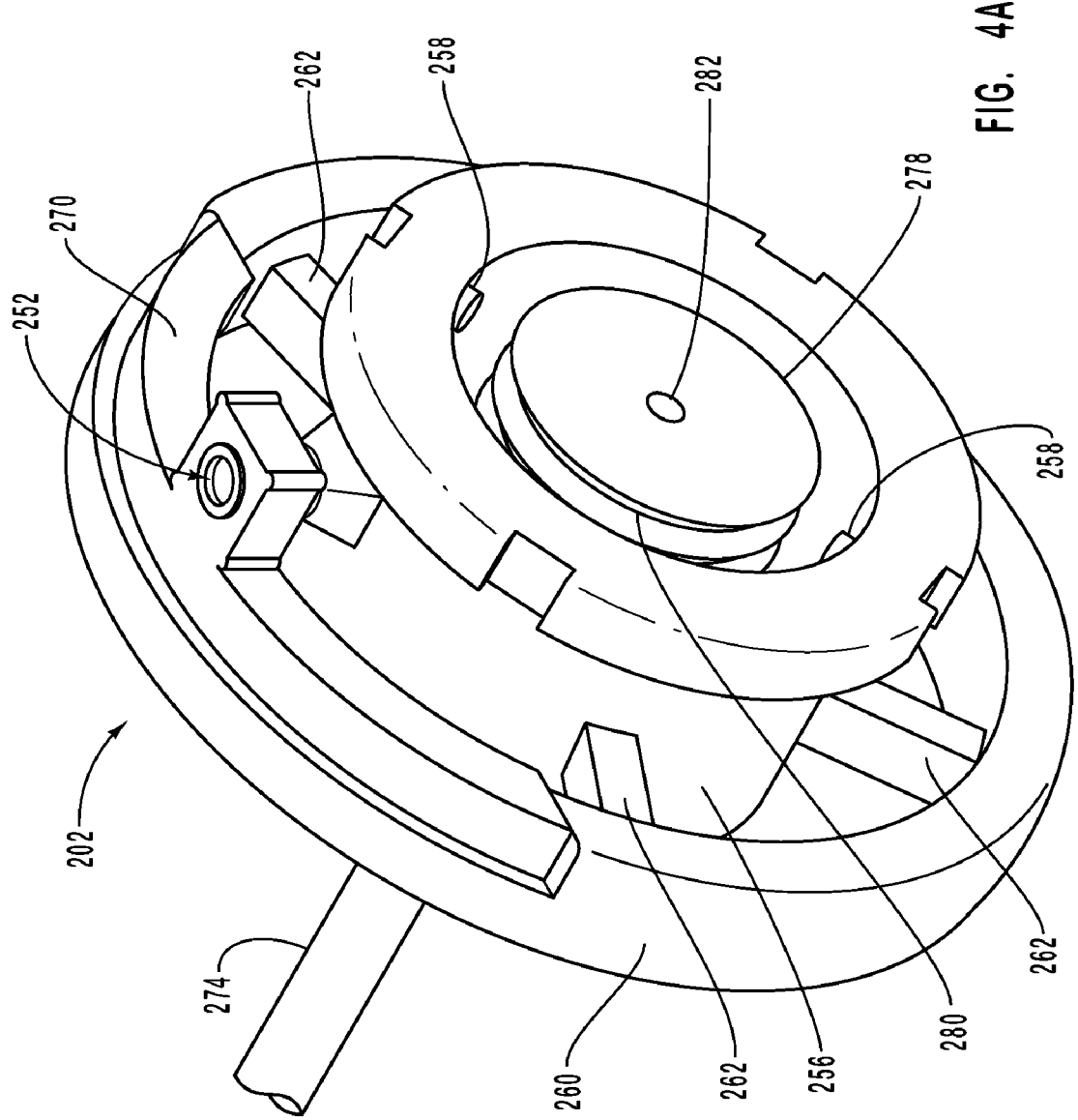
FIG. 4A is a perspective view of the end cap of FIG. 2.
Figure 4C:
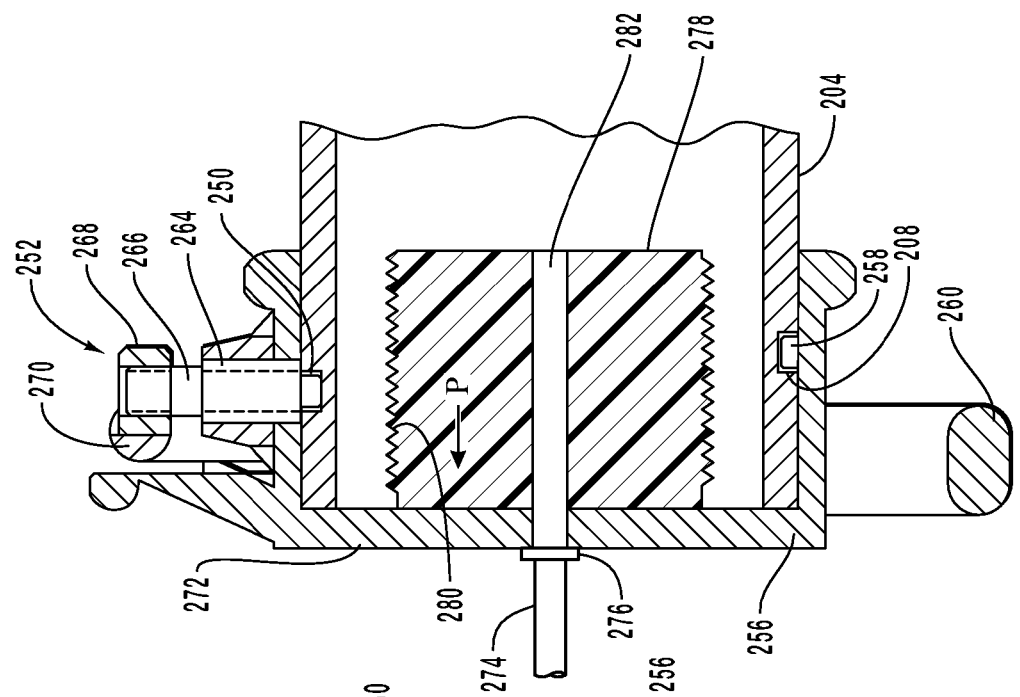
FIG. 4C is a cross-sectional side view of the pig coupling of FIG. 2 with the end cap fully engaged with the sleeve.

More particularly, as illustrated in FIGS. 2 and 4C, sleeve 204 can be connected to one end of fluid conduit 104. In one embodiment, for example, sleeve 204 is adapted to receive the end of fluid conduit 104 therein, and to be coupled thereto. It will be appreciated, however, that sleeve 204 may have other configurations. For example, sleeve 204 may be adapted to be received within fluid conduit 104 and/or may be formed directly on fluid conduit 104. In this manner, sleeve 204 may be integrally formed with fluid conduit 104 or may be a separate, and optionally removable, attachment thereto. In an example in which sleeve 204 receives fluid conduit 104, sleeve 204 and fluid conduit 104 can be configured such that the interior surface of sleeve 204 is compatible with the exterior surface of fluid conduit 104. However, it is desirable in some cases to construct sleeve 204 in such a way that a gap is introduced between the interior surface of sleeve 204 and the exterior surface of fluid conduit 104 so as to accommodate, for example, any differences in the thermal expansion rates of sleeve 204 and fluid conduit 104. Furthermore, where sleeve 204 and fluid conduit 104 are separately formed, sleeve 204 may be attached to fluid conduit 104 in any suitable manner, such as by methods including, but not limited to, welding, brazing, and soldering. In at least one embodiment, sleeve 204 and fluid conduit 104 each include mating threads so that sleeve 204 can be removably attached to fluid conduit 104. As noted above, it will be appreciated that fluid conduit 104 and sleeve 204 can also be formed as a single integral piece.

Generally, sleeve 204 comprises a metallic material that, in at least some instances, is chemically and thermally compatible with fluid conduit 104. Exemplary materials for sleeve 204 include, but are not limited to, copper and its alloys, steels, iron, aluminum and its alloys, and titanium and its alloys. Moreover, sleeve 204 may be machined, extruded or cast. Other suitable materials and/or construction methods may additionally, or alternatively, be employed.

Figure 3A:
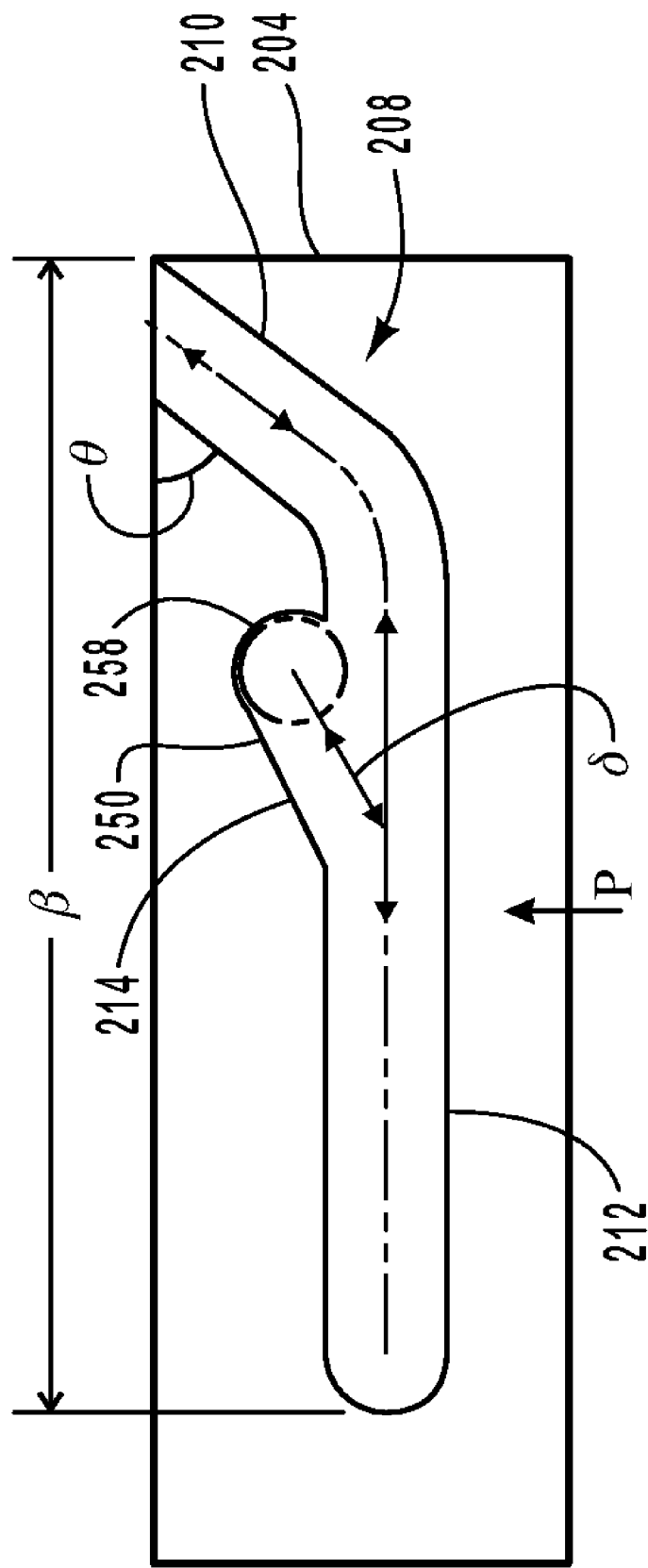
FIG. 3A is a side view illustrating aspects of an exemplary groove arrangement for a coupling such as that of FIG. 2.

As indicated in FIGS. 2 and 3A, sleeve 204 defines at least one groove 208. In some embodiments, a plurality of grooves 208 are formed and are configured and arranged to engage corresponding structure of end cap 202, as discussed in further detail herein. In one example embodiment, each of the one or more grooves 208 can include an entry segment 210 that substantially begins and opens to the front edge of sleeve 204, and which is connected to a circumferential segment 212, and/or a terminal segment 214. In the illustrated embodiment, for example, entry segment 210 cooperates to create an acute entry angle θ with respect to the front edge of sleeve 204, although in other embodiments entry segment 210 and the front edge of sleeve 204 can create an entry angle θ that is an obtuse or right angle. Where the entry angle θ is acute, such as is illustrated in FIG. 3A, any suitable angle may be used. For example, according to one embodiment, the entry angle θ is between about thirty and about sixty degrees, although it will be appreciated that entry angle θ may also be less than thirty degrees or greater than sixty degrees.

As further seen in FIGS. 2 and 3A, circumferential segment 212 can be connected to an internal end of entry segment 210 and can extend therefrom circumferentially at least partly around sleeve 204. In the illustrated embodiment, circumferential segment 212 extends substantially parallel to the front edge and circumference of sleeve 204, and thus at an obtuse angle relative to entry segment 210. It will be appreciated that the illustrated embodiment is exemplary only, however, and in other embodiments circumferential segment 212 can extend at an angle relative to the front edge and/or circumference of sleeve 204.

Circumferential segment 212 and/or entry segment 210 may further be connected to terminal segment 214. In the illustrated embodiment, terminal segment 214 extends from circumferential segment 212, although in other embodiments terminal segment 214 may instead extend from entry segment 210 or may extend from the junction between entry segment 210 and circumferential segment 212. As shown in FIG. 3A, in one example terminal segment 214 may cooperate with circumferential segment 212 to define an offset angle δ that aids in the engagement of end cap 202 with sleeve 204 generally in the manner described herein. For instance, offset angle δ may be between about twenty and about seventy degrees, in one embodiment, although offset angle δ may, in other embodiments, be less than twenty degrees or more than seventy degrees. In the embodiment illustrated in FIG. 3A, terminal segment 214 is disposed in the side of circumferential segment 212 adjacent the front edge of sleeve 204. Thus, according to one embodiment, circumferential segment 212 and terminal segment 214 cooperate to create offset angle δ such that terminal segment 214 extends toward the front edge of sleeve 204.

As noted herein, one or more grooves 208 can be formed in sleeve 204 or fluid conduit 104. Accordingly, any of a variety of different numbers of grooves 208 may be used. In one embodiment, for instance, three grooves 208 are machined, cast, or otherwise formed, in the outer surface of sleeve 204. In such an example, each groove 208 can extend at least partially around sleeve 204. For instance, each of three grooves may describe an arc β of about one-hundred twenty (120) degrees around the circumference of sleeve 204. In this manner, each circumferential segment 212 may end at a point that is about aligned with the start of another entry segment 210. In other embodiments, however, the groove 208 may have different lengths. For instance, each or any of three grooves 208 may extend an arc β less than about one-hundred twenty (120) degrees. In the case of other exemplary embodiments, such as that illustrated in FIG. 3C for example, arc β described by each groove may be such that the grooves substantially overlap each other.

It should be noted that the embodiment of grooves 208 illustrated in FIGS. 2 and 3A is exemplary only and aspects of grooves 208 such as, but not limited to, the size, number, geometry, arrangement, arc length β, entry angle θ, offset angle δ, and disposition of one or more of grooves 208 may be varied in accordance with the requirements of a particular application. Accordingly, such exemplary embodiment should not be construed to limit the scope of the invention in any way. For example, FIGS. 3B and 3C illustrate alternative embodiments of grooves 218 and 228, respectively.

Figure 3B:
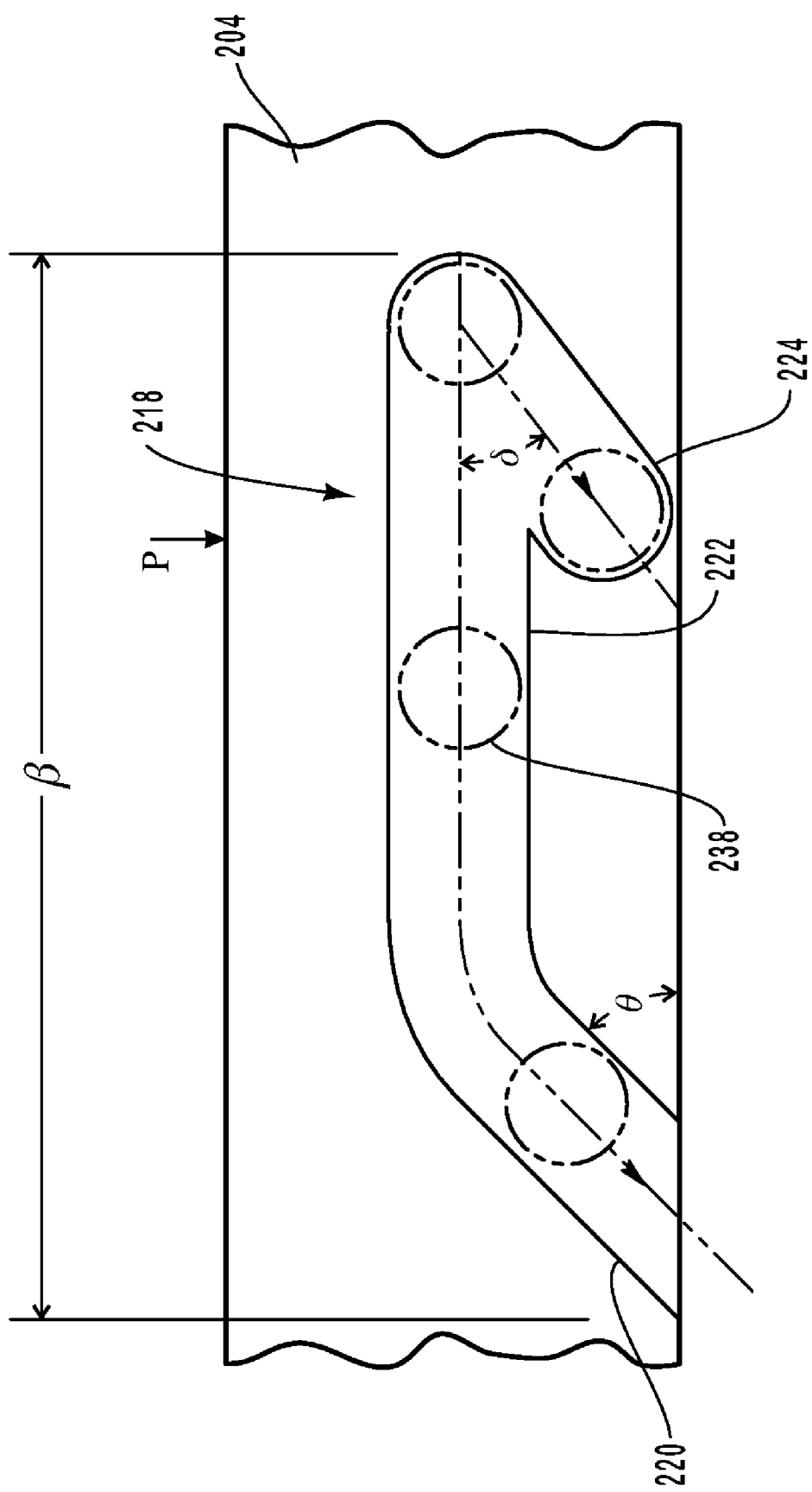
FIG. 3B is a side view illustrating aspects of another exemplary groove arrangement for a coupling such as that of FIG. 2.

In particular, FIG. 3B illustrates an example embodiment of groove 218, which includes three segments, namely, an entry segment 220 that opens at the front edge of sleeve 204, a circumferential segment 222, and a terminal segment 224. In the embodiment illustrated in FIG. 3B, terminal segment 224 is located at, and extends from, the end of circumferential segment 222 opposite an end of circumferential segment 222 that extends from entry segment 210. In the illustrated embodiment, terminal segment 214 extends from the end of circumferential segment 222 and toward the front edge of sleeve 204. Terminal segment 224 and circumferential segment 222 cooperate to create offset angle δ. In light of the disclosure herein, it will be appreciated that the fluid pressure within the fluid passageway cooperates with terminal segment 214 to couple end cap 202 and sleeve 204 together until the fluid pressure within the fluid passageway is reduced below a predetermined level.

Figure 3C:
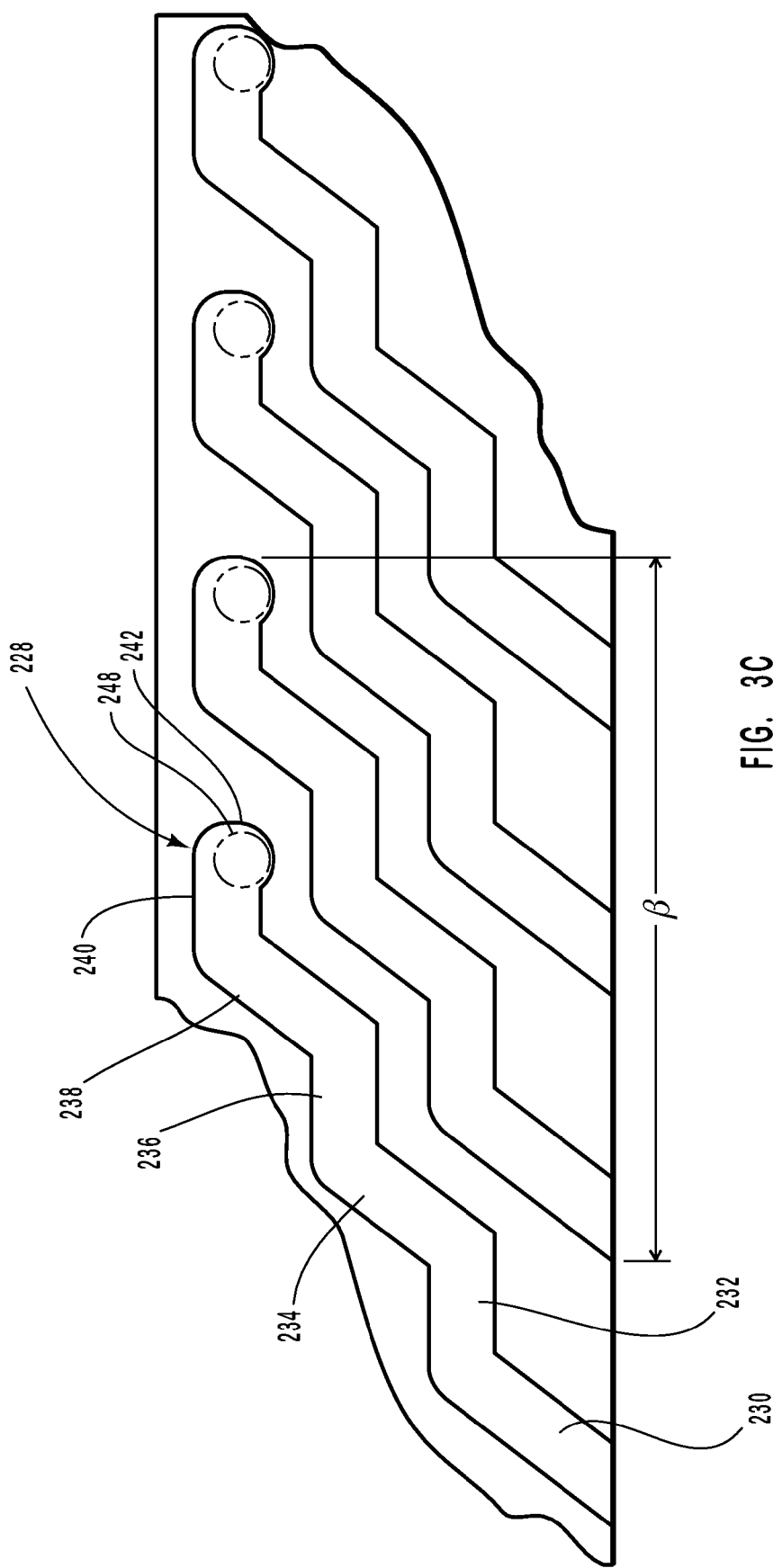
FIG. 3C side view illustrating aspects of yet another exemplary groove arrangement for a coupling such as that of FIG. 2.

In yet other embodiments of the grooves of sleeve 204, such as the embodiment illustrated in FIG. 3C, a terminal segment 228 may be generally perpendicular to a longitudinal axis of sleeve 204. Moreover, the number and arrangement of intermediate segments in a groove, or grooves, may be varied as desired. In some alternative embodiments, grooves are defined by a structure that is discrete from, but attached or attachable to sleeve 204.

FIG. 3C illustrates yet another exemplary embodiment of grooves 228 defined by, or included in or on, sleeve 204, and which include a plurality of segments, including an entry segment 230. Notably, in contrast with other embodiments such as those illustrated in FIGS. 3A and 3B, grooves 228 further include five intermediate segments denoted, respectively, 232, 234, 236, 238 and 240 as well as a terminal segment 242.

Although in the exemplary embodiment illustrated in FIG. 3C, grooves 228 are illustrated with five intermediate segments, one or more aspects of grooves 228 may be varied as necessary to suit a particular application. For example, intermediate segments 232, 236 and 240 are, in some embodiments, generally parallel to each other, while intermediate segments 234 and 238 are generally parallel to each other and to entry segment 230. In yet other embodiments, such intermediate segments are disposed in a non-parallel arrangement. Moreover, other features such as, but not limited to, the length, width and depth of one or more grooves 228 may be modified as required/desired. Additionally, while intermediate segments 232, 234, 236, 238 and 240 are described as intermediate segments, they can also be effectively considered a single circumferential segment which extends from entry segment 230 to terminal segment 242.

Figure 4B:
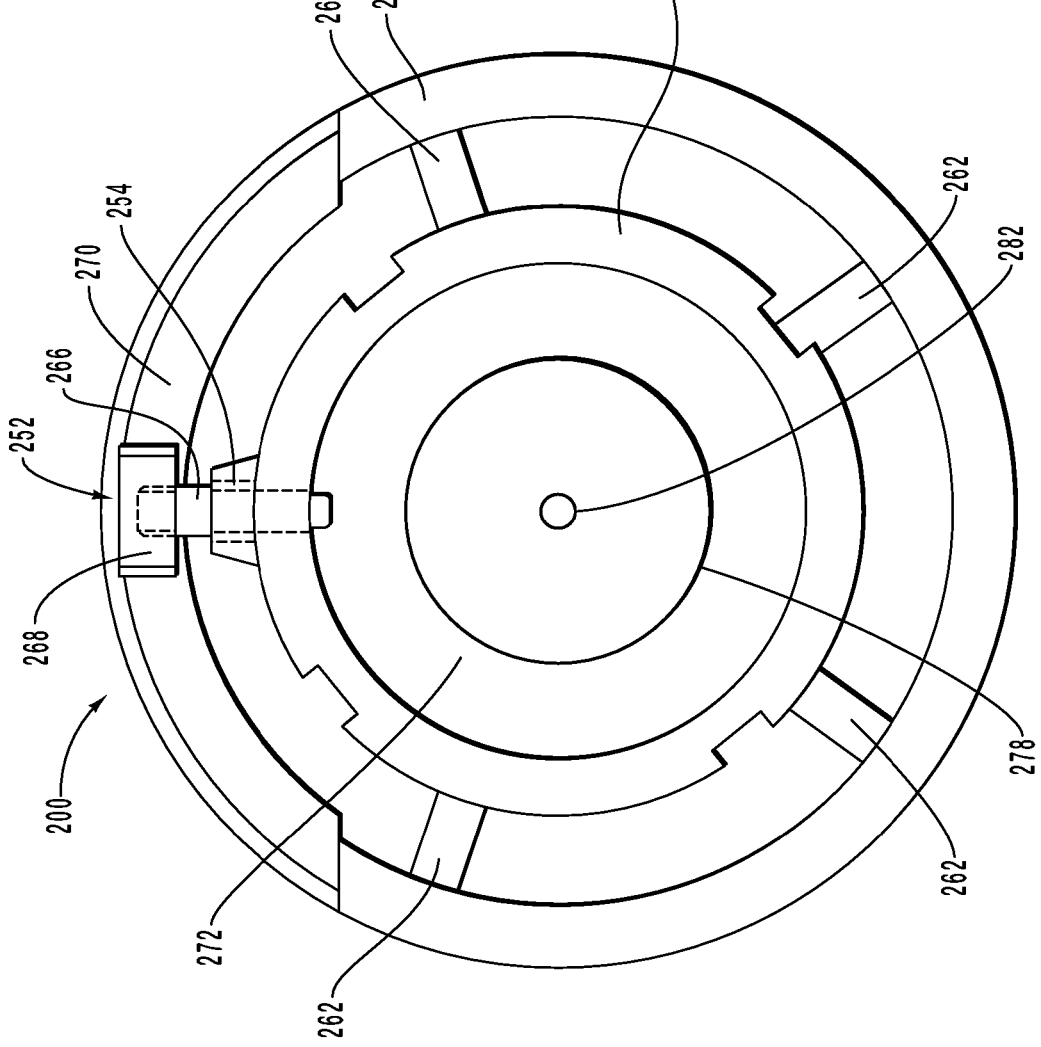
FIG. 4B is an end view of the pig coupling of FIG. 2.

As illustrated in FIGS. 4A-4C, sleeve 204 also, in some embodiments, defines a pin recess 250 formed in the wall of sleeve 204 and is configured to receive an end of a pin 252 therein, as described more fully hereinafter. In the illustrated embodiment, for example, pin recess 250 extends partially through a wall of sleeve 204. However, it will be appreciated that pin recess 250 may, in other embodiments, extend completely through a wall of sleeve 204 so as to form a hole therein. Pin recess 250 is optionally sized and configured to receive a portion of pin 252 therein, and can be positioned in sleeve 204 so as to align with a pin aperture 254 in collar 256 when end cap 202 has fully engaged sleeve 204, as best illustrated in FIG. 4C.

In correspondence with the grooves 208 (or grooves 218 or 228 from FIGS. 3B and 3C) defined by sleeve 204, end cap 202 can include a plurality of engagement members 258, each of which is configured and arranged to be received within a corresponding groove 208 and travel therealong, as suggested by the exemplary travel paths illustrated in FIGS. 3A-3C. To that end, each engagement member 258, may be a bolt, roller or other suitable member, and can have a diameter and/or thickness that generally corresponds with the width and/or depth, respectively, of a corresponding groove 208. Rollers 258 are illustrated as disposed within the interior of end cap 202, although other configurations are contemplated. It will also be appreciated that rollers 258 can be attached to end cap 202 in a variety of ways including, but not limited to, welding, brazing, soldering, and the like. Alternatively, end cap 202 and rollers 258 can be formed as an integral piece, or attached or formed in any other suitable manner. For example, rollers 258 can be adjustably attached to end cap 202 in a manner similar to that described below with respect to FIG. 8B. In some embodiments of the invention, bearings or similar structures or devices are provided to facilitate ready and reliable rotation of the rollers 258.

With continuing attention to FIG. 2, and with additional attention to FIGS. 4A-4C, further details are provided concerning certain aspects of the illustrated embodiment of end cap 202. In particular, end cap 202 includes a collar 256 with a collar handle 260 that extends, in this embodiment, around the entire circumference of collar 256. However, as shown in FIG. 8A, for example, a collar handle can comprise one or more collar handles which are not required to extend fully around collar 256. In embodiment illustrated in FIGS. 4A-4C, collar handle 260 is coupled to collar 256 by support members 262. It will be appreciated that the number, shape, and/or size of support members 262 employed to couple collar handle 260 to collar 256 can be varied while remaining within the spirit and scope of the invention. Support members 262 can also be attached to collar handle 260 and/or collar 256 in a variety of ways including, but not limited to, welding, brazing, soldering, and the like. Alternatively, collar handle 260, support members 262, and/or collar 256 can be formed as an integral piece, or attached or formed in any other suitable manner.

As illustrated in FIGS. 4B and 4C, collar 256 can define a pin aperture 264. In one embodiment, pin aperture 264 is formed through a wall of collar 256, while in other embodiments the pin aperture may extend through a guide that is not fully within a wall of collar 256, but is nevertheless considered a pin aperture. Pin aperture 264 can be sized and configured to receive a portion of pin 252 therethrough, and can be further sized and configured so as to allow the pin shaft 266 of pin 252 to rotate and/or translate within pin aperture 264. Pin aperture 264 is in this embodiment positioned in collar 256 so as to be substantially aligned with pin recess 250 of sleeve 204 when collar 256 has fully engaged sleeve 204. For example, pin aperture 264 is substantially aligned with pin recess 250 when pin 252 can be received in pin recess 250 of sleeve 204 and through pin aperture 264 of collar 256, as illustrated in FIG. 4C.

FIGS. 4A-4C also illustrate various aspects of pin 252, which may be configured to substantially prevent axial rotation of end cap 202 with respect to sleeve 204 when pin 252 is positioned in pin aperture 264 and pin recess 250. In the illustrated embodiment, for instance, pin 252 includes pin shaft 266, a pin head 268, and a pin handle 270. Pin handle 270 may be configured to enable a user to selectively move pin 252, such as to selectively remove pin 252 from pin recess 250 and/or pin aperture 264, or to insert pin 252 into pin aperture 264 and/or pin recess 250. For example, pin handle 270 may be sized and/or shaped to accommodate a particular user, or to accommodate a particular size of fluid conduit 104. It may be desirable, for instance, for pin handle 270 to be larger if the fluid conduit 104 is larger or smaller if the fluid conduit 104 is smaller.

As illustrated in FIGS. 4B and 4C, pin shaft 266 can be coupled to pin head 268, which, in turn, can be coupled to pin handle 270 so as to cause pin shaft 266 to move as pin handle 270 moves. For example, as a user exerts a force on pin handle 270 so as to extend it in a radial direction and away from sleeve 204, pin 252 can also be caused to correspondingly move in a radial direction and away from sleeve 204. Pin handle 270 can thus be configured to enable a user to grip pin handle 270 and thereby selectively move pin 252. Movement of pin 252 in this manner may, for example, partially or fully remove pin 252 from pin recess 250 of collar 256 and/or pin aperture 264 of sleeve 204. Similarly, movement of pin 252 in an opposite direction may insert pin 252 into pin aperture 264 and/or pin recess 250.

In some embodiments, pin handle 270 is coupled to the proximate end of pin 252, thus eliminating the need for pin head 268. Alternatively, pin handle 270 can be coupled to pin head 268, while pin head 268 is in turn is coupled to the proximate end of pin 252. As a result, pin handle 270 can be directly or indirectly coupled to pin 252. In other alternative embodiments, pin 252 and pin handle 270 are formed as a single, integral piece. In any configuration, pin handle 270 can be either directly or indirectly coupled to pin 252 such that inward or outward movement of pin handle 270 correspondingly moves pin 252 inward or outward.

As illustrated in FIGS. 4A and 4B, pin handle 270 may extend around a portion of the circumference of end cap 202. In the illustrated embodiment, for example, pin handle 270 defines an arc of about one hundred twenty (120) degrees about the circumference of end cap 202. However, the arc defined by pin handle 270 can be larger or smaller than one hundred twenty (120) degrees. For example, in other embodiments, pin handle 270 defines an arc of about sixty (60) degrees, about ninety (90) degrees, or about one hundred eighty (180) degrees. Other aspects, characteristics, functions, and the like, of pin 252, pin aperture 264, pin recess 250, pin head 268, and/or pin handle 270 can also apply equally to the present invention, including as described elsewhere herein.

In the example embodiment of FIGS. 4A-4C, collar handle 260 and pin handle 270 are positioned adjacent to each other. More particular, in the illustrated embodiment, a recess of about the shape of pin handle 270 is formed in collar handle 260, and pin handle 270 is positioned such that it generally corresponds with the recess in collar handle 260. Accordingly, collar handle 260 and pin handle 270 can have a stacked or nested arrangement. In other embodiments, however, collar handle 260 may not be configured to receive pin handle 270, and collar handle 260 and pin handle 270 may merely be placed proximate each other. In either such embodiment, or in still other embodiments, collar handle 260 and pin handle 270 my be positioned such that a user can simultaneously grip both collar handle 260 and pin handle 270 with either one or two hands.

In the illustrated embodiment, a radius from a central, longitudinal axis of end cap 202 to collar handle 260 can be definite and unchanging. The radius from the longitudinal axis to pin handle 270 may, however, vary. For example, pin handle 270 may, in an innermost position, have a radius slightly smaller than the fixed radius of collar handle 260, although in other embodiments pin handle 270 has a radius about equal to, or larger, than collar handle 260. As described herein, the innermost position of pin handle 270 can correspond to a biased position of pin 252.

As discussed above, pin 252 can move with respect to pin aperture 264 and/or pin recess 250 and may be withdrawn at least partially therefrom. When pin 252 is connected to pin handle 270, this may occur by, for example, exerting a force which pulls pin handle 270 away from collar 256. Because pin 252 can be withdrawn from pin aperture 264 and/or pin recess 250 by pulling pin handle 270 away from collar 256, the distance between pin handle 270 and the central axis of end cap 202 and/or sleeve 204 can increase. Accordingly, in one embodiment, the radius between the central, longitudinal axis of end cap 202 and pin handle 270 can increase to a radius about equal to, or greater than, the radius of collar handle 260. In one embodiment, when pin handle 270 is about diametrically aligned with collar handle 260, pin 252 is withdrawn from pin recess 250. In some embodiments, pin handle 270 can be used to entirely withdraw pin 252 from both pin aperture 264 and pin recess 250.

Various configurations of a pin recess 250 are envisioned within the scope of the present invention. One such configuration is illustrated in FIG. 3A, in which pin recess 250 comprises terminal segment 214 of groove 208. In other words, pin recess 250 and terminal segment 214 can constitute the same recess within sleeve 204. Thus, when pin 252 is positioned in pin recess 250 and/or terminal segment 214, rollers 262 may be aligned with, and optionally positioned in, circumferential segment 212. Of course, in other embodiments, pin recess 250 may be aligned with, and potentially include, entry segment 210 or circumferential segment 212. In still other embodiments, pin recess 250 is not aligned with any portion of groove 208.

Pin 252 can be held in position within pin aperture 264 and/or pin recess 250 by any of a number of different mechanisms. For example, pin 252 may be biased into the position illustrated in FIGS. 4B and 4C by use of a spring or resilient member (not shown). Alternatively, pin 252 may be biased through an interference fit between pin shaft 266 of pin 252 and one or both of pin aperture 264 and pin recess 250. Also, pin aperture 264 and pin recess 250 may be positioned in collar 256 and sleeve 204, respectively, such that when the fluid conduit 104 (FIG. 1) is stationary, pin aperture 264 and pin recess 250 face generally upward or in another alignment that allows gravity to influence the positioning of pin 252.

Pin 252 is optionally selectively removable from pin recess 250 and/or pin aperture 264 so as to enable axial rotation of end cap 202 with respect to sleeve 204. For example, the ability of pin 252 to move with respect to pin aperture 264 and/or pin recess 250 enables pin 252 to be selectively removable. In at least one embodiment, pin 252 can be completely removed from both pin aperture 264 and pin recess 250 by a user to enable axial rotation of end cap 202 with respect to sleeve 204. Alternatively, pin 252 can be removed, selectively by a user, by moving pin 252 such that the distal end of pin shaft 266 is no longer received in pin recess 250 of sleeve 204, thus enabling axial rotation of end cap 202 with respect to sleeve 204. End cap 202 can thus be selectively secured to sleeve 204 by a user positioning pin 252 in pin recess 250 as is sufficient to substantially prevent axial rotation of end cap 202 with respect to sleeve 204.

End cap 202 can further include an end plate 272 that extends across one end of collar 256, as seen in FIGS. 4B and 4C, in such a way as to assist in defining an end of a fluid passageway from fluid conduit 104 when end cap 202 and sleeve 204 are fully engaged. In the illustrated embodiment, end plate 272 and collar 256 comprise a single integral piece. However, in other embodiments, end plate 272 and collar 256 can comprise discrete structures that are or can be joined together. Thus, end cap 202 can include a collar 256 which is either integral with other components of the end cap 202, or which is separate, and optionally selectively removable therefrom.

The example embodiment of end cap 202 further comprises an additional fluid conduit 274 that is in fluid communication with the interior of collar 256. The additional fluid conduit 274 can carry a fluid similar to, or the same as, that within fluid conduit 104 (FIG. 1), or it may be a different fluid. For instance, fluid conduit 274 may comprise an air hose that carries compressed or pressurized air used for moving a pig within a fluid system.

In the illustrated embodiment, air hose 274 is coupled to end cap 202 by using an air hose coupling 276 that can be positioned on end cap 202 in any of a variety of places. For example, in the illustrated embodiment, air hose coupling 276 is positioned on end plate 272 of end cap. The connection between air hose coupling 276 and end plate 272 may be such so as to allow air hose 274 to be coupled to air hose coupling 276 to enable deliver of pressurized fluid, such as air, to the fluid passageway within fluid conduit 104 when end cap 202 and sleeve 204 are fully engaged. It will be appreciated, however, that air hose coupling 276 can be coupled to end cap 202 in any suitable position and in any suitable manner that enables air hose coupling 276 and air hose 274 to introduce fluid into fluid conduit 104. For example, air hose coupling 276 could be connected to end cap 202 through a wall of collar 256. As described in greater detail herein, the introduction of fluid, such as air, through air hose 274 and air hose coupling 276 can facilitate movement of pig 300 (FIG. 6) through fluid conduit 104 to clean and/or remove residual fluid from fluid conduit 104.

As illustrated in FIG. 4B, for example, end cap 202 can also include an end cap insert 278, which can be coupled to end plate 272, for example. End cap insert 278 can function as a sealing mechanism to assist in regulating the flow of fluid within fluid conduit 104. For example, end cap insert 278 can be sized and configured to fit within sleeve 204 when end cap 202 and sleeve 204 are engaged, and such that end cap insert 278 substantially prevents fluid within fluid conduit 104 from flowing into end cap 202 or through air hose coupling 276. End cap insert 278 can be constructed of a variety of materials, or combinations thereof, including, but not limited to, metal, plastic, rubber, and the like. In addition, end cap insert 278 can include various other features. For instance, end cap insert 278 can include ridges 280 that facilitate compression of end cap insert 278 when end cap 202 and sleeve 204 are at least partially engaged. Further, end cap insert 278 can include an airway 282 extending through about a middle of end cap insert 278 to facilitate the transfer of air from air hose coupling 276 to fluid conduit 104. It will be appreciated, however, that in some embodiments end cap 202 will not, and need not, have end cap insert 278. Furthermore, while end cap insert 278 may be detachable from end cap 202, it will also be appreciated that end cap insert 278 may, in other embodiments, be substantially permanently connected to end cap 202, or may be integral therewith.

The operational features relating to the coupling and decoupling of end cap 202 and sleeve 204 of the example embodiment of FIGS. 2-4C will now be discussed in greater detail. Prior to end cap 202 receiving a portion of sleeve 204 therein, the distal end of pin shaft 266 of pin 252 should not extend beyond the inner surface of collar 256. Otherwise, as end cap 202 is inserted onto sleeve 204, pin 252 may inadvertently engage sleeve 204 and make it difficult to couple end cap 202 to sleeve 204. The distal end of pin shaft 266 can be withdrawn from the inner surface of collar 256, as described above, by simply exerting a force on pin handle 270 so as to extend pin handle 270 in a radial direction relative to the center of end cap 202. Radial movement of pin handle 270 can cause corresponding movement of at least the distal end of pin shaft 266, thereby withdrawing pin shaft 266 from within the inner surface of collar 256.

With pin 252 withdrawn from the inner surface of collar 256, engagement of end cap 202 and sleeve 204 can be effected by positioning each roller 258 in a corresponding groove 208 and causing rollers 258 to travel along grooves 208 according to the path denoted in FIG. 3A, for example. More particularly, end cap 202 and sleeve 204 may be brought together until each roller 258 of collar 256 is positioned at the beginning of an entry segment 210 (see FIG. 3A) of a corresponding groove 208 of sleeve 204. Rotation of end cap 202 is then initiated by way of collar handle 260. As a result of the angular orientation of entry segments 210 with respect to the front edge of sleeve 204, the initial rotation of end cap 202 causes end cap 202 to be drawn toward sleeve 204. In other words, as rollers 258 are advanced in entry segment 210 of groove 208, end cap 202 rotates relative to sleeve 204.

Continued rotation of end cap 202 can cause rollers 258 to complete their traverse of corresponding entry segments 210, and move into their respective circumferential segments 212. Rollers 258 can remain in circumferential segments 212 until such time as a predetermined pressure level is attained in the fluid passageway conduit 104 collectively defined by end cap 202, sleeve 204, and fluid conduit 104, or when rotated into that position by a user.

In one embodiment, the end cap 202 is rotated and positioned such that rollers 258 are in respective circumferential segments 212. Once end cap 202 is in such a position, fluid can be introduced into fluid conduit 104, and the distal end of pin shaft 266 can be positioned in pin recess 250 of sleeve 204 so as to substantially prevent axial rotation of end cap 202 with respect to sleeve 204. It will be appreciated in view of the disclosure herein that pin recess 250 of sleeve 204 may extend at least partially along the length of the sleeve such that as pressure is introduced in the fluid conduit 104, rollers 258, attached to collar 256, may be able to move and lock up into corresponding terminal segments 214 of grooves 208 and remain therein, as indicated in FIG. 3A. In other embodiments, as fluid is introduced into fluid conduit 104, pin shaft 166 may be positioned in terminal segment 214 so as to prevent movement of rollers 258 along circumferential segments 212.

In still other embodiments, after the introduction of fluid, and while the line is pressurized, pin shaft 266 may be removed from terminal segment 214 or another recess, thereby allowing rollers 258 to again move in circumferential segment 212. Alternatively, pin 252 may be excluded. In either case, the pressure thus exerted by the fluid in fluid conduit 104, denoted at P in FIG. 4C, may allow end cap 202 to at least partially rotate relative to sleeve 204. The pressure can, however, transmit a force to end cap 202. Consequently, as rollers 258 approach terminal segments 215, the exertion of P in this way forces rollers 258, optionally attached to collar 256, to move into and lock up into corresponding terminal segments 214 of grooves 208 and remain therein, as indicated in FIG. 3A.

In the illustrated embodiment, the forward motion of end cap 202 may, depending on the position of rollers 258 at the time of pressurization of fluid conduit 104, be accompanied by a rotary motion of end cap 202 as well. The rotary motion of end cap 202 can cause rollers 258 to travel along circumferential segments 212 and come to rest in terminal segments 214 of grooves 208.

Once rollers 228 are seated in their corresponding terminal segments 214 of grooves 208, the continuing presence of pressure P exerts a force on end cap 202 that resists motion of rollers 258 in the opposite direction, i.e., out of their corresponding terminal segments 214, and thereby aids in the retention of rollers 258 in terminal segments 214. As a result, end cap 202 and sleeve 204 cannot be disengaged from each other by the user until the fluid pressure in fluid conduit 104 has been reduced to a predetermined level.

Thus, the rollers 258 and grooves 208 cooperate with each other, one feature of which is the employment of the line pressure to ensure a secure connection between end cap 202 and sleeve 204 subsequent to pressurization of fluid conduit 104, and even in the event pin 252 is removed from pin recess 250 during pressurization. Thus, the likelihood of inadvertent, or intentional, removal of end cap 202 while a potentially dangerous level of pressure exists in fluid conduit 104 is materially reduced.

As will thus be appreciated by one of ordinary skill in the art in view of the disclosure herein, if pin 252 is withdrawn from pin recess 250 before the pressure within fluid conduit 104 is released, the pressure in fluid conduit 104 will press against end cap 202. Such pressure can cause rollers 258 to move along grooves 208 toward entry segments 210. Without terminal segments 214, rollers 258 could exit groove 208, thereby resulting in disengagement of end cap 202 and sleeve 204. Disengagement of end cap 202 and sleeve 204 while fluid conduit 104 is still under pressure can result in numerous dangers. For instance, fluid can leak into the environment and/or the fluid pressure may forcibly cause end cap 202 to become dislodged from fluid conduit 104. End cap 202 may then uncontrollably fly off fluid conduit 104 and hit an operator, user, or equipment, or the fluid itself my forcibly exit and contact a user or equipment, thereby causing serious bodily injury or property damage.

Notably, when terminal segment 214 is employed, such problems can be entirely or largely prevented. Specifically, if pin 252 is withdrawn from pin recess 250 while the fluid passageway is under pressure, rollers 258 will begin to move along grooves 208 towards entry segments 210; however, before reaching entry segments 210, rollers 258 will encounter and engage terminal segments 214 as described above. The groove geometry of terminal segments 214 is configured to use the line pressure in such a way to prevent further movement of rollers 258 toward entry segments 210, and thus also prevent disengagement of end cap 202 and sleeve 204. Once the pressure in fluid conduit 104 is released, or reduced beyond a determined level, the line pressure can be overcome and a user will be able to disengage rollers 258 from terminal segments 214. Once rollers 258 are disengaged from terminal segments 214, end cap 202 and sleeve 204 can be safely disengaged.

While the foregoing are example embodiment in which the line pressure is released before rollers 258 can be removed from terminal segments 214, it will be appreciated in view of the disclosure herein that such are exemplary only. For example, in other embodiments, the line pressure need not be entirely reduced. Instead, in one example, rollers 258 may become fixed within terminal segments 214, as described above, when the line pressure is above a predetermined level. Once the line pressure is reduced below that predetermined level, which can be zero or greater than zero pressure, the user may be able to overcome the line pressure and disengage rollers 258 from terminal segments 214. The predetermined level may be a pressure that does not cause significant leakage of the fluid from conduit 104 and/or a level that is determined to pose minimal or no risk of significant bodily injury.

Figure 5A:
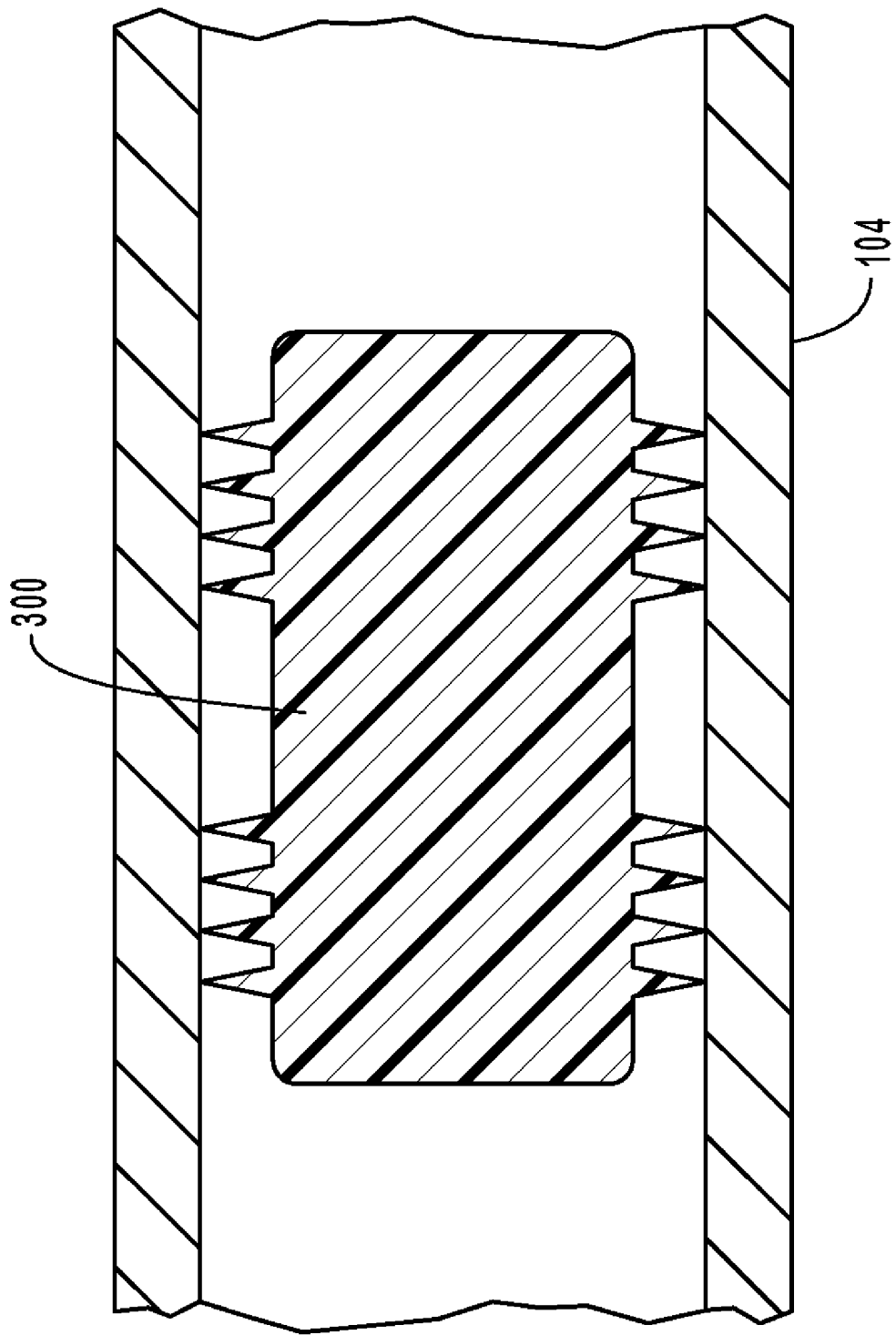
FIG. 5A is a cross-sectional view of a pipe having therein an exemplary embodiment of a pig for use in cleaning the interior of the pipe.
Figure 5B:
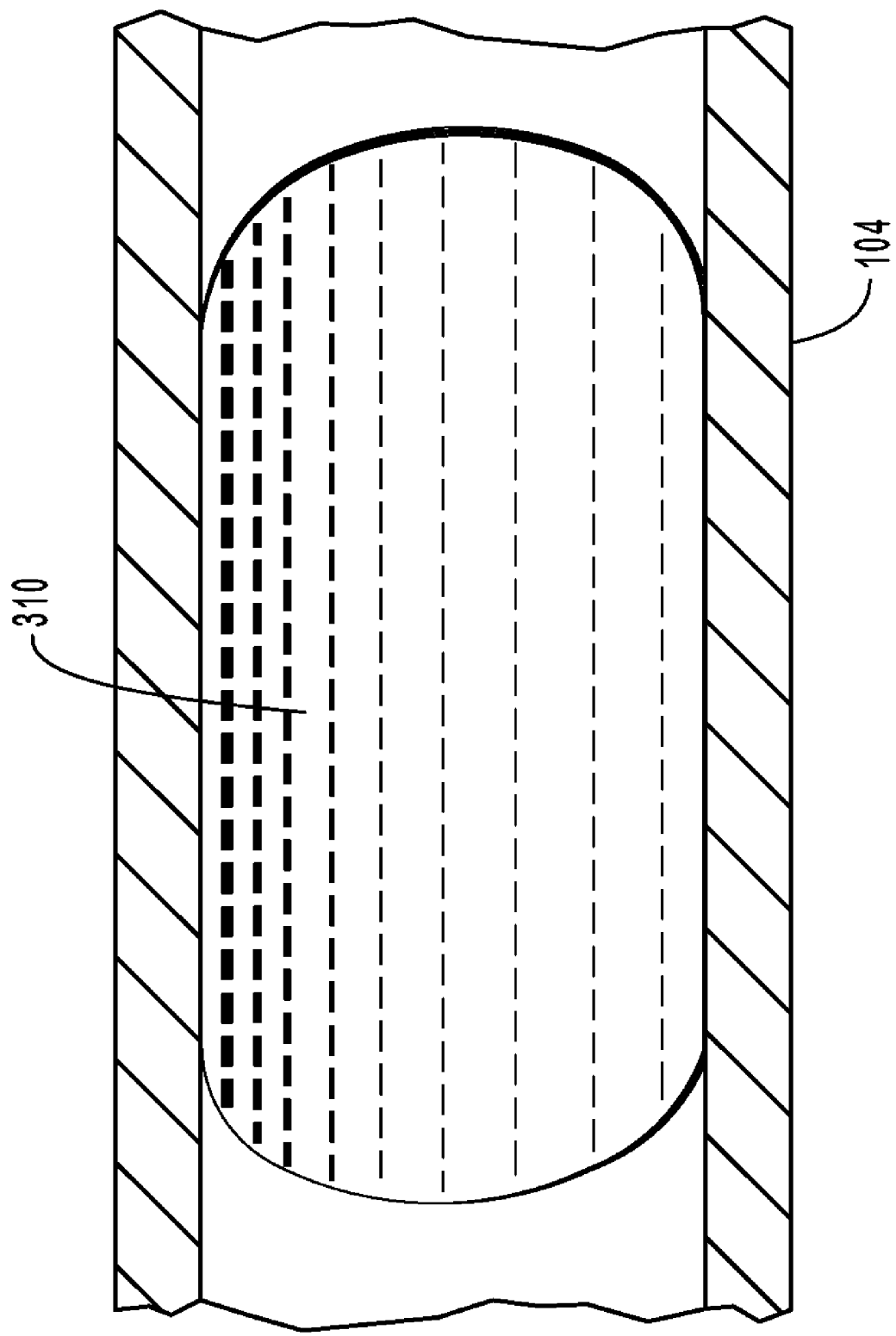
FIG. 5B is a cross-sectional view of a pipe having therein another exemplary embodiment of a pig for use in cleaning the interior of the pipe.
Figure 5C:
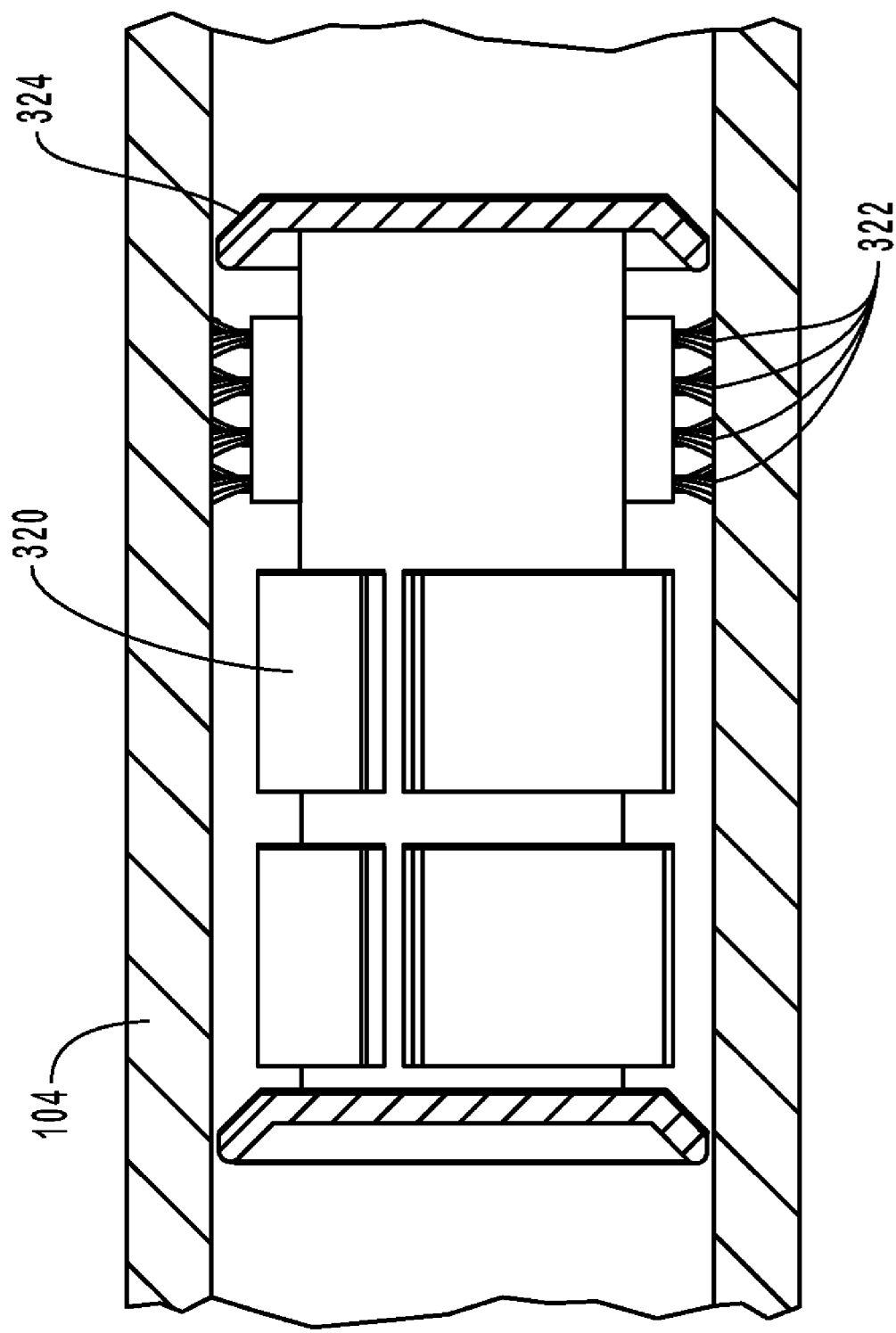
FIG. 5C is a cross-sectional view of a pipe having therein yet another exemplary embodiment of a pig for use in cleaning the interior of the pipe.

With attention to FIGS. 5A-5C, various example embodiments of fluid system cleaning devices, commonly known as "pigs," are illustrated. Generally, pigs can include bullet-shaped devices that are passed or propelled through a pipeline for a multitude of uses. Pigs are generally known in the prior art and are often either mechanical or chemical. Mechanical pigs, such as pig 320 illustrated in FIG. 5C, normally have wire brushes 322 or abrasive surfaces to physically abrade the scale on the interior of fluid conduit 104. Chemical or gelled pigs, such as pigs 300 and 310 illustrated in FIGS. 5A and 5B, respectively, are normally chemically based devices that have the ability to conform to the interior shape of fluid conduit 104. Thus, a tight seal can be formed so that material before the pig can be separated from material behind the pig. The separation process permits manufacturers to quickly change fluids within fluid conduit 104 without the fear of mixing or interchanging the chemical components of the fluids.

For example, U.S. Pat. No. 4,345,350 issued Aug. 24, 1982, to Burd and entitled "Pipeline Cleaning Equipment," incorporated herein by reference, discloses a mechanical pig for removing ferromagnetic debris from the internal surface of pipelines. Mechanical pigs, have a variety of uses in connection with the operation of fluid systems used for the transport of fluids such as natural gas or oil. They may be used for inspecting the internal surfaces of fluid conduit 104 and, for this purpose, can carry a variety of test equipment such as polarizing magnets and magnetic field sensors, ultrasonic probes, contact styli or the like.

Still, another form of mechanical pigs, such as pig 320, serves to clean fluid conduit 104 and for this purpose carries brushes 322 and scrapers 324 to remove or loosen scale or other debris from fluid conduit 104 surfaces they pass through.

Alternatively, U.S. Pat. No. 4,543,131, issued Sep. 24, 1985, to Purinton Jr. and entitled "Aqueous Crosslinked Gel Pigs For Cleaning Pipelines," incorporated herein by reference, discloses a chemical or gelled pig containing an aqueous, crosslinked gelled galactomannan gum, or derivative thereof. Such a pig is also used primarily for cleaning the interior of fluid conduits 104. Gelled or chemical pigs, such as pigs 300 and 310, remove the surface deposits by dissolution and/or by picking up loose debris as they pass through fluid conduit 104. Such pigs can be either passed through fluid conduit 104 alone or may be used in pig trains containing one or more chemical pig segments in the train. Other gelled chemical pigs contain bactericides to remove bacteria-containing scale from fluid conduits 104.

A feature of chemical or gelled pigs is that such devices are able to create a tight chemical seal in fluid conduit 104, allowing the pig to clean fluid conduits 104 which are filled with fluid without first evacuating fluid conduit 104. Passing the gelled pigs with the tight chemical seal, then, displaces the fluid contents of fluid conduit 104 ahead of the pig or the pig train, without contamination of materials behind the leading chemical or gelled pig.

Figure 6:
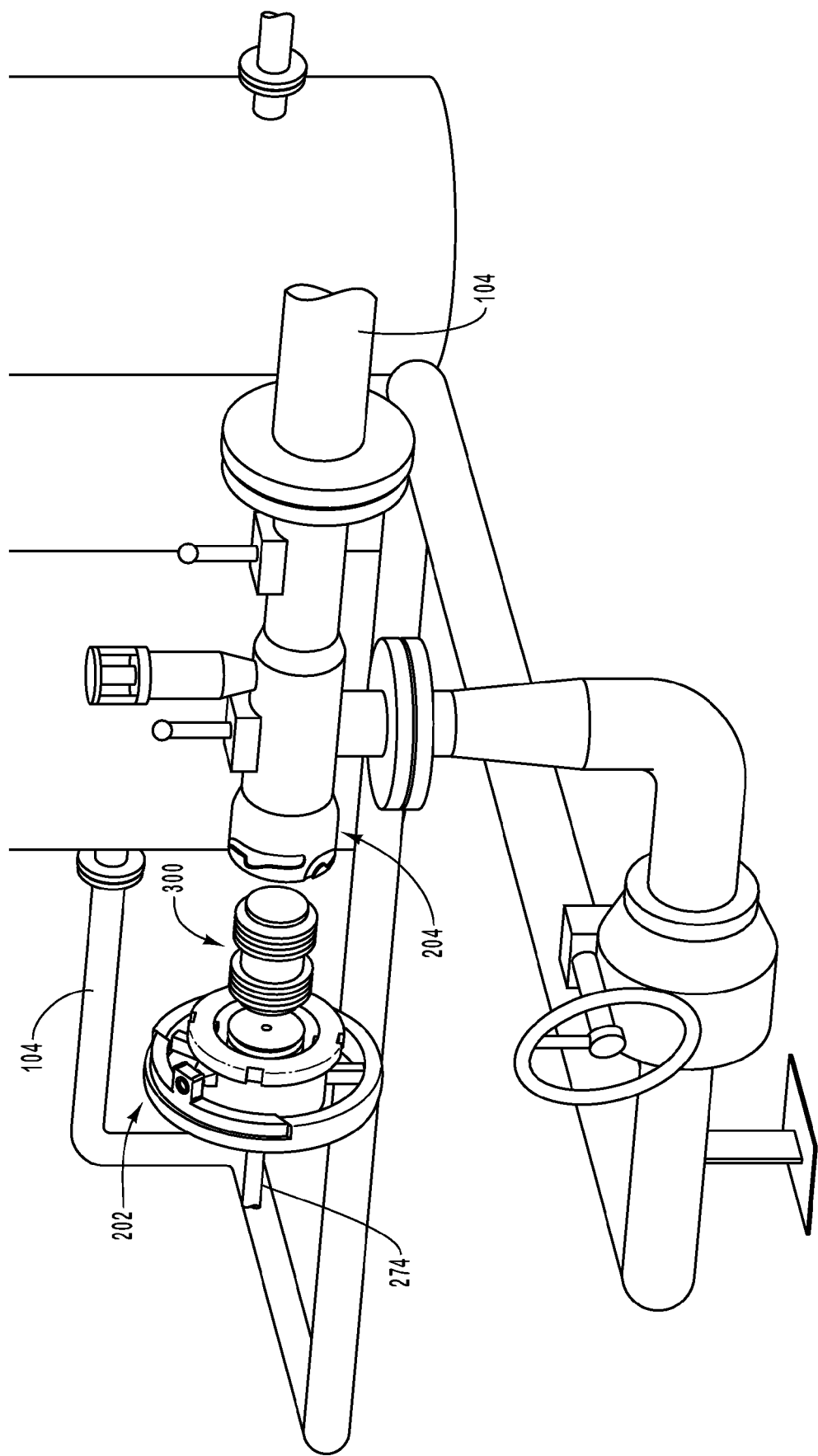
FIG. 6 is another perspective view of the fluid system of FIG. 1, further illustrating an exploded view of a coupling to illustrate the introduction of a pig into the fluid system.

In light of the above discussion relating to the coupling and decoupling of end cap 202 and sleeve 204 and the function of pigs 300 and with reference to FIG. 6, a discussion of an exemplary method for introducing pig 300 into fluid system 100 will now be presented. While exemplary method for introducing a pig 300 into a fluid system 100 with be described with reference to the embodiment illustrated in FIGS. 1-5A, it will be appreciated that various modification are envisioned within the scope of the present invention. For example, end cap 202 could be replaced with any of various end caps, couplings, or valves disclosed or suggested herein. Additionally, while the exemplary method is directed to introducing a pig 300 into fluid system 100 by removing end cap 202 from sleeve 204, inserting pig 300 into fluid conduit 104, and re-coupling end cap 202 to sleeve 204, it will be appreciated that various modifications to the method are within the scope of the present invention. For example, the method can be directed to removal of a pig 300 from fluid system 100, or include other similar modifications.

As noted above, and assuming end cap 202 is already coupled to sleeve 204, the method for introducing pig 300 into fluid system 100 can comprise various primary steps or acts. First, end cap 202 may be removed from sleeve 204. It will be appreciated that due to the various embodiments of end cap 202, removal of end cap 202 from sleeve 204 may itself include one or more acts or steps. However, in light of the discussion herein, such modifications will be readily apparent to one of ordinary skill. Additionally, if end cap 202 is not already coupled to sleeve 204, this initial step can be bypassed.

When end cap 202 is fully engaged with sleeve 204, pin 252 may be disposed within pin aperture 264 and/or pin recess 250, thus preventing axial rotation of end cap 202 relative to sleeve 204. Therefore, in order to enable removal of end cap 202 from sleeve 204, pin 252 may be withdrawn from pin recess 250 and/or pin aperture 264. With pin 252 removed from at least pin recess 250, end cap 202 can rotate axially relative to sleeve 204. However, if rollers 258 are engaged within terminal segments 214, the user must disengage rollers 258 before being able to remove end cap 202 from sleeve 204. As previously discussed, if the pressure within fluid conduit 104 is above a predetermined level, the groove position and geometry of terminal segments 214 may cooperate with the line pressure to prevent disengagement of rollers 258 from grooves 208. Therefore, fluid conduit 104 should be depressurized prior to attempting to remove end cap 202 from sleeve 204. Once the pressure in fluid conduit 104 is released, the line pressure can be overcome and the user can disengage rollers 258 from terminal segments 214. Once rollers 258 are disengaged from terminal segments 214, end cap 202 can be rotated axially relative to sleeve 204 such that rollers 258 can traverse the circumferential and entry segments 210 and 212 of sleeve 204 to entirely disengage end cap 202 from sleeve 204.

With end cap 202 removed from sleeve 204, sleeve 204 and the interior of the end of fluid conduit 104 is exposed. A pig can then be inserted within the end of fluid conduit 104. As discussed above, a variety of pigs are known in the art. The type of pig used in a particular situation will be determined, at least in part, by the type of fluid system involved, the fluids used within the particular fluid system, the desired result sought, i.e., cleaning the walls of fluid conduit 104 or removal of residual fluid from fluid conduit 104. Nevertheless, regardless of the use a selected pig, which purpose may be as described herein or as is now or will in the future be known in the art, any such pig should be broadly considered a fluid system cleaning device in the context of the present description and in the appended claims.

Once pig 300 has been inserted into fluid conduit 104, end cap 202 can then be re-coupled to sleeve 204. Coupling of end cap 202 to sleeve 204 can be accomplished by substantially reversing the process followed to disengage end cap 202 from sleeve 204. In particular, the distal end of pin 252 is withdrawn from the inner surface of collar 256 by exerting a force on pin handle 270 so as to extend it in a radial direction relative to the center of end cap 202, as described above. With pin 252 withdrawn from the inner surface of collar 256, engagement of end cap 202 and sleeve 204 can be effected by positioning rollers 258 in corresponding grooves 208 and causing rollers 258 to travel along grooves 208 according to the path denoted in FIG. 3A, for example. More particularly, end cap 202 and sleeve 204 are brought together until each roller 258 is positioned in the entry segment 210 of a corresponding groove 208. Rotation of end cap 202 is then initiated by way of collar handle 260. As a result of the angular orientation of exemplary entry segments 210, the initial rotation of end cap 202 causes end cap 202 to be drawn toward sleeve 204. Continued rotation of end cap 202 causes rollers 258 to complete their traverse of corresponding entry segments 210, and move into their respective circumferential segments 212. Rollers 258 can either remain in circumferential segments 212 (either until release of line pressure or only until a predetermined pressure level is attained in fluid conduit 104) or rollers 258 can be moved to lock into corresponding terminal segments 214. At this point, pin 252 can optionally be positioned within pin aperture 264 and pin recess 250 to prevent axial rotation of end cap 202 relative to sleeve 204.

With pig 300 disposed within fluid conduit 104, and end cap 202 securely coupled to sleeve 204, a fluid, such as air, can be introduced into end cap 202 through air hose 274 and air hose coupling 276. The fluid introduced into end cap 202 can be sufficiently pressurized so as to project or move pig 300 through fluid conduit 104. Movement of pig 300 through fluid conduit 104 can remove residual fluid from and/or clean the interior of fluid conduit 104, as described above. Additionally, the pressurized fluid can also cause end cap 202 to rotate axially relative to sleeve 204, as described above. Such axial rotation can, in some embodiments, facilitate secure engagement of rollers 258 within terminal segments 214.

Fluid system 100 can also include additional air hose couplings 276 and air hoses 274 for introducing pressurized fluid within fluid system 100 at other locations in the system. For example, fluid system 100 can include an air hose coupling 276 and an air hose 274 at a location on fluid conduit 104 that is distant from the illustrated pig coupling 200. The additional air hose coupling 276 and air hose 274 can be employed to introduce a pressurized fluid, such as air, into fluid conduit 104 to project pig 300 back to pig coupling 200 after pig 300 has completed cleaning fluid conduit 104, for example.

Once pig 300 has finished cleaning or removing residual fluid from fluid conduit 104, or performing another desired function, and pig 300 has been returned to pig coupling 200, pig 300 can be removed from fluid system 100 simply by removing end cap 202 from sleeve 204 as described above and retrieving pig 300.

In light of the disclosure herein, it will be appreciated by one of ordinary skill in the art that various modification to the above described systems, devices, and methods can be made while still falling within the scope of the present invention. For example, it is contemplated that fluid system components, such as those illustrated in FIGS. 7-10 could be used in place of, or in conjunction with the devices described above while remaining within the scope of the present invention. Furthermore, it will also be appreciated from the following discussion that the embodiments illustrated in FIGS. 7-10 can include similar features and provide similar functionality as those previously described. Moreover, it will be appreciated that the present invention can be practiced with a fluid system having various other components not discussed herein. For example, fluid system 100 can also include valve assemblies that can be used to regulate the flow of fluid through fluid system 100. An exemplary valve assembly that can be employed in fluid system 100 is disclosed in United States Patent Publication No. 2006/0278839, published Oct. 17, 2007, entitled "Quick Disconnect Valve Assembly", the content of which is incorporated herein by reference in its entirety.

Figure 7:
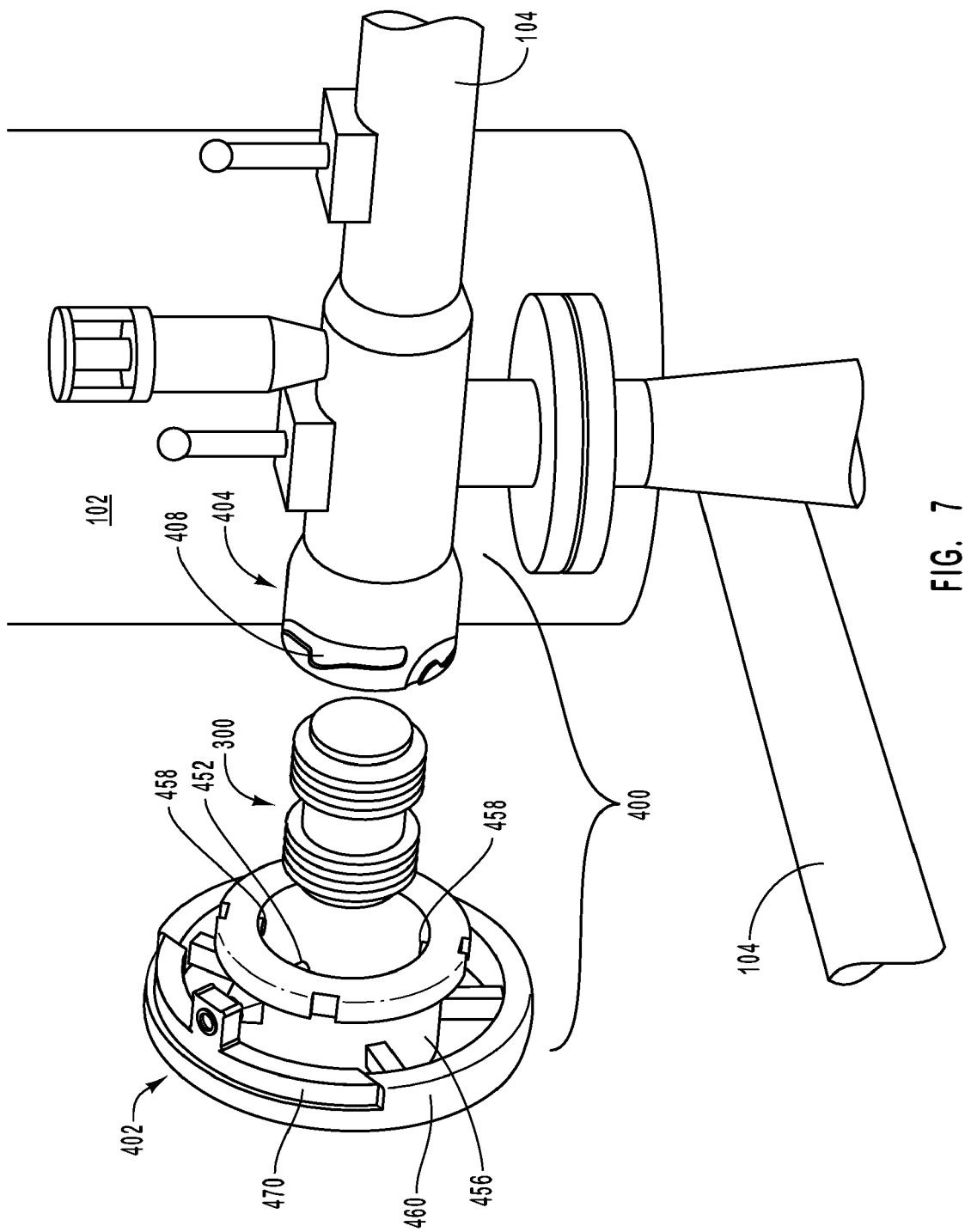
FIG. 7 is a perspective view of another embodiment of a fluid system, and which includes an end cap and a sleeve that can be releasably connected to each other and which can be used to introduce a pig into the fluid system.

With attention now to FIG. 7, there is illustrated a fluid system 100 that includes a fluid source 102 configured for fluid communication with one or more fluid conduits 104. At least one of fluid conduits 104 comprises a pig coupling 400, which is configured to enable quick and convenient introduction of pig 300 into fluid conduit 104 in the same manner as described above with regard to pig coupling 200. Fluid conduits 104 are configured for selective fluid communication between fluid source 102 and fluid destination 106.

Similar to pig coupling 200 (see FIG. 1), pig coupling 400 can include a sleeve 404 that is configured to receive, be coupled to, or be a part of the end of fluid conduit 104. Additionally, an end cap 402 can be configured to be positioned on or within sleeve 404 to at least partially define a fluid passageway within fluid conduit 104. End cap 402 and sleeve 404 may allow for quick and convenient access to the interior of fluid conduit 104 for insertion or removal of a pig 300 from fluid conduit 104. Sleeve 404 can be substantially identical to and/or interchangeable with sleeve 204. Additionally, end cap 402 and sleeve 404 can include various features which substantially prevent fluid leakage and/or undesirable take down of fluid system 100, including one or more O-rings, or other sealing elements.

End cap 402, as illustrated in FIG. 7, is substantially the same as end cap 202 of FIG. 6. For example, end cap 402 can include rollers 458 coupled to a collar 456, a collar handle 460, a pin 452, a pin handle 470, a pin aperture, and the like, which are identical or similar to the corresponding parts of end cap 202. However, end cap 402 need not include many of the features and elements of end cap 202. For example, end cap 402 does not, in the illustrated embodiment, include an air hose coupling or an air hose. In addition, end cap 402 does not include an end cap insert. While an end cap insert, air hose coupling, and air hose can fulfill various functions as discussed above, end cap 402 remains functional and can be employed in and provide benefits for various situations that may not suitable for end cap 202.

In operation, end cap 402 can be coupled to and decoupled from sleeve 404 in the same manner that end cap 202 is coupled to and decoupled from sleeve 204. For example, pin 452 is withdrawn from the inner surface of collar 456 by exerting a radial force on pin handle 470. Rollers 458 of end cap 402 can then be aligned with and inserted into grooves 408 of sleeve 404. End cap 402 is then rotated axially until rollers 458 and pin aperture 464 are appropriately positioned such that pin 452 can be positioned within pin aperture 464 and pin recess 450. From this description of pig coupling 400, and the discussion of pig coupling 200, one of ordinary skill in the art will appreciate that the main difference between the exemplary pig couplings 200 and 400 is that pressurized fluid used to project pig 300 through fluid conduit 104 is introduced through end cap 202 when using pig coupling 200, but not through end cap 404 when using pig coupling 400. In the case of end cap 404, a pig 300 may instead be propelled by other means. For instance, pressurized fluid may be introduced through sleeve 404, fluid conduit 104, or another suitable method.

Figure 8B:
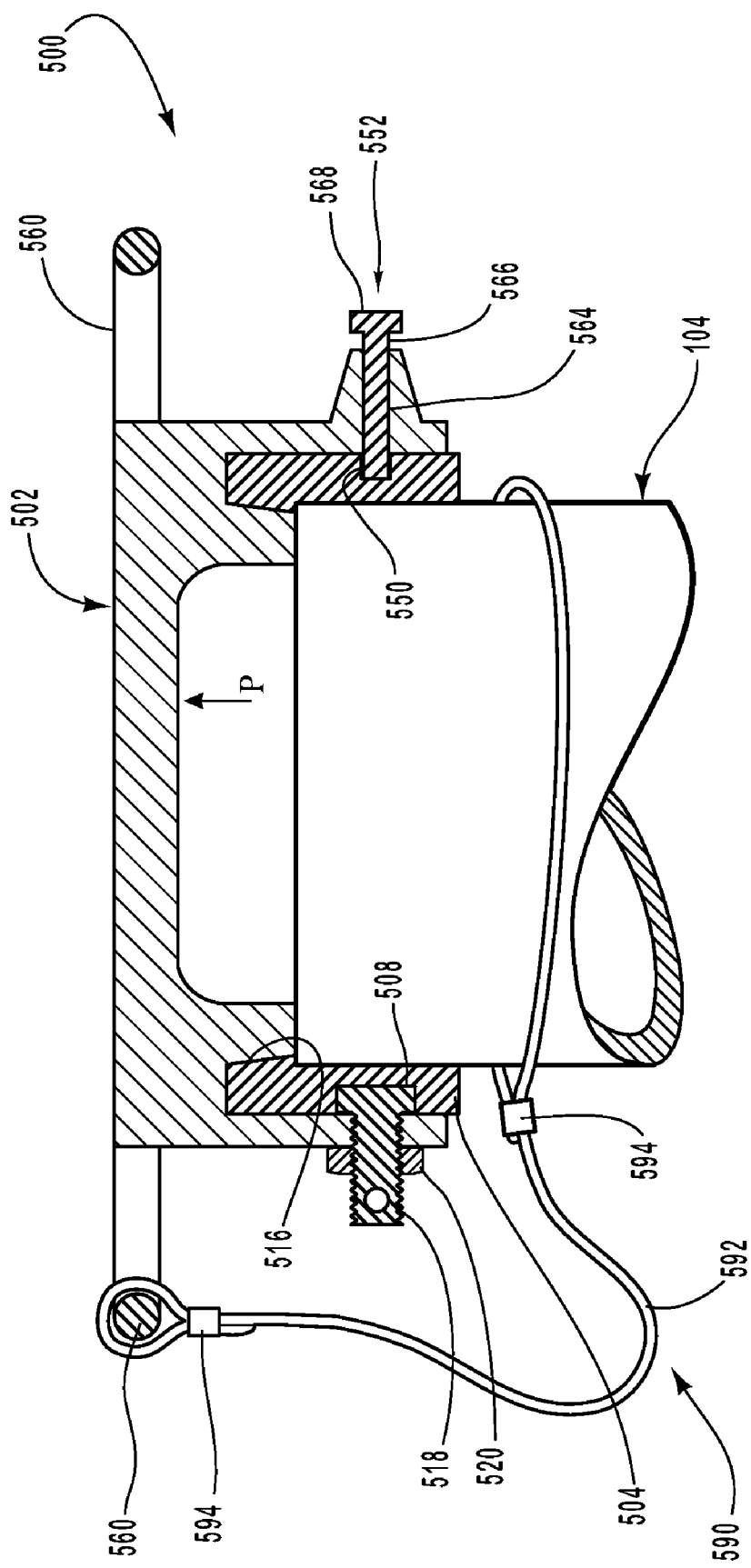
FIG. 8B is a cross-sectional side view of a coupling similar to that of FIG. 8A.

Directing attention now to FIGS. 8A and 8B, details are provided concerning an exemplary embodiment of a pig coupling, generally denoted at 500. In the illustrated embodiment, pig coupling 500 generally includes a sleeve 504 configured to receive the end of a fluid conduit 104, and a coupling, such as end cap 502, configured to be positioned on the end of fluid conduit 104 and cooperating with fluid conduit 104 to at least partially define a fluid passageway when so positioned.

More particularly, sleeve 504 can define an inner diameter that is compatible with an outer diameter of fluid conduit 104, such that sleeve 504 can receive an end of fluid conduit 104 therein. It is desirable in some cases to construct sleeve 504 in such a way that a gap is introduced between the interior surface of sleeve 504 and the exterior surface of fluid conduit 104 so as to accommodate, for example, any differences in the thermal expansion rates of sleeve 504 and fluid conduit 104. The sleeve 504 may be attached to fluid conduit 104 in any suitable manner, such as by methods including, but not limited to, welding, brazing and soldering. In at least one embodiment, sleeve 504 and fluid conduit 104 each include mating threads so that sleeve 504 can be removably attached to fluid conduit 104. In another embodiment sleeve 504 and fluid conduit 104 are integrally formed.

Generally, sleeve 504 comprises a metallic material that, in at least some instances, is chemically and thermally compatible with fluid conduit 104. Exemplary materials for sleeve 504 include, but are not limited to, copper and its alloys, steels, iron, aluminum and its alloys, and titanium and its alloys. Moreover, sleeve 504 may be machined or cast. Other suitable construction methods may alternatively be employed.

With continuing reference to its various geometric features, sleeve 504 can, further include a substantially annular chamfer 516 that defines an opening wherein a portion of end cap 502 is received, as indicated in FIG. 8B. Generally, the geometry of chamfer 516 is configured to correspond to the structure of end cap 502 with which it interfaces. Geometric aspects of chamfer 516 such as, but not limited to, the wall thickness and chamfer angle may be adjusted as necessary to suit the requirements of a particular application.

As further indicated in FIG. 8B, sleeve 504 defines a one or a plurality of grooves 508 that are configured and arranged to engage a corresponding structure of end cap 502, discussed in further detail herein. Grooves 508 can comprise similar construction and geometries as grooves 208, 218 and/or 228 illustrated in FIGS. 3A-3C. In particular, each of grooves 508 can, but need not necessarily, include an entry segment, a circumferential segment or a plurality of intermediate segments, and/or a terminal segment which are similar or identical to entry segments 210, 220 or 230, circumferential segments 212, 222 or 232 or intermediate segments 232, 234, 236, 238 or 240, and/or terminal segments 214, 224 or 242. Additionally, grooves 508 can describe an arc β about at least a portion of the circumference of sleeve 504, and the terminal segment can cooperate with the circumferential segment, one or more intermediate segments, and/or an entry segment to define an offset angle that aids in the engagement of end cap 502 with sleeve 504 generally described elsewhere herein.

It should be noted that the embodiments of grooves 208, 218 and 228 illustrated in FIGS. 3A-3C are exemplary only and aspects of grooves 508 such as, but not limited to, the size, number, geometry, arrangement, arc length β, entry angle θ, offset angle δ, and disposition of one or more of grooves 508 may be varied in accordance with the requirements of a particular application. Accordingly, such exemplary embodiment should not be construed to limit the scope of the invention in any way.

In correspondence with the grooves 508 defined by sleeve 504, end cap 502 includes a plurality of rollers 558, each of which is configured and arranged to be received within a corresponding groove 508 and to travel therealong, as suggested by the exemplary roller travel paths illustrated in FIGS. 3A-3C and as described above with reference to rollers 258. To that end, each roller 558 can have a diameter and thickness that generally corresponds with the width and depth, respectively, of a corresponding groove 508. As indicated in FIG. 8B, rollers 558 can be disposed within the interior of end cap 502 and attached to a corresponding fastener 518 that passes through end cap 502. Each fastener 518 may be secured in position by a corresponding nut 520, and the extent to which rollers 558 protrude into the interior of end cap 502 may be changed by adjusting the positioning of nuts 520 accordingly. In some embodiments of the invention, bearings or similar structures or devices are provided to facilitate ready and reliable rotation of the rollers 558.

As illustrated in FIG. 8B, sleeve 504 defines a pin recess 550 formed in the wall of sleeve 504 configured to receive an end of a pin 552 therein, as described more fully herein. In the illustrated embodiment, pin recess 550 extends partially through the wall of sleeve 504. However, it will be appreciated that pin recess 550 may extend completely through the wall of sleeve 504 so as to form a hole through a portion of sleeve 504. The pin recess 550 can also be sized and configured to receive a portion of pin 552 therein, and positioned in sleeve 504 so as to align with a pin aperture 564 in end cap 502 when end cap 502 has fully engaged sleeve 504, as illustrated in FIG. 8B.

As further illustrated in FIG. 8B, end cap 502 defines a pin aperture 564. In one embodiment, pin aperture 564 is formed through the side wall of end cap 502. Pin aperture 564 can also be sized and configured to receive a portion of pin 552 therethrough. Pin aperture 564 may further be sized and configured so as to allow shaft 566 of pin 552 to rotate and/or translate within pin aperture 564. Pin aperture 564 is, in the illustrated embodiment, positioned in end cap 502 so as to be substantially aligned with pin recess 550 of sleeve 504 when end cap 502 has fully engaged sleeve 504. For example, pin aperture 564 is substantially aligned with pin recess 550 when pin 552, for example, can be received in pin recess 550 of sleeve 504 through pin aperture 564 of end cap 502, as illustrated in FIG. 8B.

With continued reference to FIG. 8B, the illustrated pig coupling 500 further includes a pin 552 configured to substantially prevent axial rotation of end cap 502 with respect to sleeve 504 when pin 552 is positioned in pin aperture 564 and pin recess 550. In the illustrated embodiment, pin 552 includes a pin head 568 coupled to a shaft 566. The pin head 568 may be configured to enable a user to selectively move pin 552, such as to remove pin 552 from pin recess 550 and/or pin aperture 564 or to insert pin 552 into pin aperture 564 and/or pin recess 550. For example, pin head 568 may be sized and/or shaped to accommodate a particular use, or to accommodate a particular size of fluid conduit. It may be desirable, for example, for pin head 568 to be larger if the fluid conduit is larger or smaller if the fluid conduit is smaller. Further, pin 552 may also include a pin handle 570 similar to pin handle 246 described above with respect to FIGS. 4A-4C.

As illustrated in FIG. 8B, pin shaft 566 can be coupled to pin head 568 so as to cause pin shaft 566 to move as pin head 568 moves. In this manner, as pin head 568 is moved away from end cap 502, pin shaft 566 naturally follows and moves in the direction of pin head 568. In particular, when a user grips pin head 568 and moves it in a direction away from pin recess 550 and pin aperture 564, pin shaft 566 is correspondingly removed from pin recess 550 and/or pin aperture 564. Pin shaft 566 includes, in this embodiment, a proximal end adjacent pin head 568 and an opposing distal end adjacent sleeve 504. As illustrated in FIG. 8B, the proximal end of pin shaft 566 can be configured to be received and movable in pin aperture 564 of end cap 502. The opposing distal end of pin shaft 566 may additionally, or alternatively, be configured to be received and movable in pin recess 550 of sleeve 504. In this manner, pin shaft 566 can be positioned in both pin recess 550 and pin aperture 564 to substantially prevent axial rotation of end cap 502 with respect to sleeve 504.

Pin 552 can be held in a desired position by using a number of mechanisms. For example, pin 552 may be biased into the position illustrated in FIG. 8B by use of a spring or resilient member. Alternatively, pin 552 may be biased through an interference fit between pin shaft 566 and one or more of pin aperture 564 and pin recess 550. Also, pin recess 550 and pin aperture 564 may be positioned in sleeve 504 and end cap 502, respectively, such that when fluid conduit 104 is stationary pin aperture 564 and pin recess 550 face upwards thus allowing gravity to influence the positioning of pin 552.

Pin 552 is selectively removable so as to enable axial rotation of end cap 502 with respect to sleeve 504. For example, the ability of pin 552 to move in pin aperture 564 and pin recess 550 enables pin 552 to be selectively removable from one or both of pin aperture 564 and pin recess 550. In at least one embodiment, pin 552 can be completely removed from both pin recess 550 and pin aperture 564 by a user to enable axial rotation of end cap 502 with respect to sleeve 504. Alternatively, pin 552 can be removed, selectively by a user, by moving pin 552 such that the distal end of pin shaft 566 is no longer received in pin recess 550 of sleeve 504, thus potentially enabling axial rotation of end cap 502 with respect to sleeve 504. End cap 502 can be selectively secured to sleeve 504 by a user positioning pin 552 in pin aperture 564 and pin recess 550 sufficient to substantially prevent axial rotation of end cap 502 with respect to sleeve 504. It should also be appreciated in view of the disclosure herein that while removal of pin 552 from pin recess 550 may, in some embodiments, enable axial rotation of end cap 502 with respect to sleeve 504, in other embodiments mere removal of pin 552 in this manner will not enable such rotation about a longitudinal axis of end cap 502. For example, as described herein, a roller 552 may be locked in a terminal segment of a groove 508 such that when the line is pressurized, end cap 502 may be substantially prevented from axial rotation.

Pin 552 is one example of means for selectively securing end cap 502 with respect to sleeve 504, particularly when end cap 502 receives at least a portion of sleeve 504 therein, as illustrated in FIG. 8B. Another example of means for selectively securing includes a threaded shaft or bolt that is received through a corresponding aperture in end cap 502 and screwed or otherwise secured into a threaded aperture in sleeve 504. Another example of a means for selectively securing includes the use of a friction fit between end cap 502 and sleeve 504, such as a clamp that squeezes end cap 502 to sleeve 504 so that an inner surface of end cap 502 engages an outer surface of sleeve 504 sufficient to substantially prevent axial rotation of end cap 502 with respect to sleeve 504. In still other embodiments, end cap 502 may be received within sleeve 504 and a similar means for selectively securing end cap 502 with respect to sleeve 504 may be used.

As described herein, axial rotation of end cap 502 with respect to sleeve 504 can be substantially reduced when pin 552 is positioned in pin aperture 564 and/or pin recess 550. The shape and size of pin aperture 564 and pin recess 550 may substantially correspond with the shape and size of pin shaft 566 of pin 552. When positioned in pin aperture 564 and pin recess 550, pin 552 serves as a means of interference to end cap 502 being able to axially rotate about sleeve 504. In this manner, pin 552 links end cap 502 to sleeve 504 to substantially prevent axial rotation of end cap 502 with respect to sleeve 504.

It will be appreciated that the shape and size of pin 552 may not exactly correspond with the shape and size of pin aperture 564 and pin recess 550, which may result in a small degree of slack or give in the securement of end cap 502 with respect to sleeve 504. This small degree of slack or give may allow end cap 502 to rotate slightly about sleeve 504. However, the degree of rotation would likely be limited and not be enough to allow end cap 502 to be rotated off of sleeve 504. Furthermore, it will be appreciated that with sufficient force pin 552 may be sheared and severed when positioned in pin aperture 564 and pin recess 550 such that end cap 502 can rotate about sleeve 504. Typically, however, such sufficient force would not be exerted on pin 552, thus allowing pin 552 to substantially prevent axial rotation of end cap 502 with respect to sleeve 504.

In the embodiment illustrated in FIG. 8B, end cap 502 comprises a single integral structure. However, in will be appreciated that end cap 502 can comprise multiple discrete structures that can be coupled together. An exemplary cap that includes multiple discrete structures is shown and described in U.S. patent application Ser. No. 11/769,560, filed Jun. 27, 2007, and entitled "Fluid System Coupling with Handle Actuating Member," which is incorporated herein by reference in its entirety.

The illustrated exemplary embodiment of end cap 502 includes one or more handles 560 that permit a user to impart a rotary motion so as to engage or disengage end cap 502 and sleeve 504. Handles 560 may comprise steel bar stock, molded or cast components, or any other suitable materials and/or configurations. In at least one embodiment, handles 560 can be attached to end cap 502 and configured such that handles 560 can be rotated between a use position and a storage position. Additionally, pig coupling 500 can also include one or more stops (not shown) which serve to prevent over rotation of end cap 502 with respect to sleeve 504. In one embodiment, groove 508 can serve as a stop to prevent over rotation of end cap 502, by limiting the arc path of rollers 558 within grooves 508. Moreover, pig coupling 500 can include alignment tabs to provide information to a user regarding the engagement of end cap 502 and sleeve 504. Example embodiments of rotatable handles, stops, and alignment tabs are illustrated and described in U.S. patent application Ser. No. 11/769,560, which has been incorporated herein by reference.

In some embodiments, pig coupling 500 additionally or alternatively includes a safety restraint 590 comprising, for example, a cable 592 and cable crimps 594. In an exemplary embodiment, cable 592 comprises a one eighth (0.125) inch diameter steel cable looped through at least one handle 560 and around fluid conduit 104 or sleeve 504, and retained in place by cable crimps 594, as shown in FIG. 8B. Generally, safety restraint 590 operates as a redundant safety system that serves to prevent, or reduce, damages to personnel or surrounding equipment and systems in the event end cap 502 becomes disconnected, in an uncontrolled manner, from sleeve 504.

The operational aspects of the embodiment illustrated in FIGS. 8A and 8B are substantially similar, in many regards, to the operation aspects as described herein above with reference to FIGS. 2-4C. For example, prior to end cap 502 receiving a portion of sleeve 504 therein, the distal end of pin shaft 566 of pin 552 can be withdrawn from the inner surface of end cap 502, as described above, by simply exerting a force on pin head 568 so as to extend it in a radial direction relative to the center of end cap 502. Radial movement of pin head 568 may thereby cause corresponding movement of the distal end of pin shaft 566, thereby withdrawing pin shaft 566 from within the inner surface of end cap 502.

With pin 552 withdrawn from the inner surface of end cap 502, engagement of end cap 502 and sleeve 504 can be effected by positioning each roller 558 in a corresponding groove 508 and causing rollers 558 to travel along grooves 508 according to the path denoted in FIG. 3A, for example. More particularly, end cap 502 and sleeve 504 are brought together until each roller 558 is positioned in the entry segment of a corresponding groove 508 of sleeve 504. Rotation of end cap 502 is then initiated by way of handle 560. As a result of the angular orientation of entry segments, the initial rotation of end cap 502 causes end cap 502 to be drawn toward sleeve 504.

Continued rotation of end cap 502 causes rollers 558 to complete their traverse of corresponding entry segments and move into their respective circumferential segments. Rollers 558 can remain in circumferential segments until such time as a predetermined pressure level is attained in the fluid passageway collectively defined by end cap 502, sleeve 504, and fluid conduit 104.

Once end cap 502 is in position such that fluid can be introduced into fluid conduit 104, the distal end of pin shaft 566 can be positioned in pin recess 550 of sleeve 504 so as to substantially prevent axial rotation of end cap 502 with respect to sleeve 504. It is appreciated that pin recess 550 of sleeve 504 may extend at least partially along the length of sleeve 504 such that pin 552 can be positioned in, for example, terminal segments of groove 508. Additionally, or alternatively, as pressure is introduced in fluid conduit 104, rollers 558, attached to end cap 502, may also able to move and lock up into corresponding terminal segments of grooves 508 and remain therein, as discussed with respect to FIG. 3A, for example.

Subsequently, fluid is introduced into fluid conduit 104, thereby pressurizing the fluid passageway. The pressure thus exerted, denoted at P in FIG. 8B, transmits a force to end cap 502. Consequently, the exertion of P in this way can forces rollers 558, to lock up into corresponding terminal segments of grooves 508 and remain therein, as indicated in FIG. 3A for example. As will be appreciated in view of the disclosure herein, such movement may, however, be substantially prevented if pin 552 is itself locked in place in the terminal segment of a groove 508.

In the illustrated embodiment, the forward motion of end cap 502 may, depending on the position of rollers 558 at the time of pressurization of fluid within fluid conduit 104, be accompanied by a rotary motion of end cap 502. Specifically, the rotary motion of end cap 502 can cause rollers 558 to travel along circumferential segments and come to rest in terminal segments of grooves 508.

Once rollers 558 are seated in their corresponding terminal segments of grooves 508, the continuing presence of pressure P exerts a force on end cap 502 that resists motion of rollers 558 in the opposite direction, i.e., out of their corresponding terminal segments, and thereby aids in the retention of rollers 558 in terminal segments. As a result, end cap 502 and sleeve 504 cannot be disengaged from each other until the fluid pressure in fluid conduit 104 has been reduced to a predetermined level or differential.

Thus, rollers 558 and grooves 508 can cooperate with each other and feature the employment of the line pressure to ensure a secure connection between end cap 502 and sleeve 504 subsequent to pressurization of fluid conduit 104. Thus, the likelihood of inadvertent, or even intentional, removal of end cap 502 while a potentially dangerous level of pressure exists in fluid conduit 104 is materially reduced.

As will be appreciated by one of ordinary skill in the art in view of the disclosure herein, if pin 552 is withdrawn from pin recess 550 before the pressure within fluid conduit 108 is released, the pressure in fluid conduit 108 will press against end cap 502. Such pressure can cause rollers 558 to move along grooves 508 toward entry segments. Without terminal segments, rollers 508 could potentially exit grooves 508, thereby resulting in disengagement of end cap 502 and sleeve 504. Disengagement of end cap 502 and sleeve 504 while fluid conduit 108 is still under pressure can result in numerous problems. For instance, fluid can leak into the environment and/or the fluid pressure may forcibly cause end cap 502 to become dislodged from fluid conduit 104. End cap 502 may then uncontrollably fly off fluid conduit 104 and hit an operator or user, or the fluid itself my forcibly exit and contact a user, thereby causing serious bodily injury and/or property damage.

Notably, when terminal segment is employed, such problems can be entirely or largely prevented. Specifically, if pin 552 is withdrawn from pin recess 550 while the fluid passageway is under pressure, rollers 558 will begin to move along grooves 508 towards entry segments; however, before reaching entry segments, rollers 558 will encounter and engage terminal segments as described above. The groove geometry of terminal segments is configured to use the line pressure in such a way to prevent further movement of rollers 558, and thus also prevent disengagement of end cap 502 and sleeve 504. Once the pressure in fluid conduit 104 is released, the line pressure can be overcome and a user will be able to disengage rollers 558 from terminal segments. Once rollers 558 are disengaged from terminal segments, end cap 502 and sleeve 504 can be safely disengaged.

While the foregoing example embodiment in which the line pressure is released before rollers 558 can be removed from terminal segments, it will be appreciated in view of the disclosure herein that this is exemplary only. For example, in other embodiments, the line pressure need not be entirely reduced. Instead, in one example, rollers 558 may become fixed within terminal segments, as described herein, when the line pressure is above a predetermined level. Once the line pressure is reduced below that predetermined level, which can be equal to or greater than zero pressure, the user may be able to overcome the line pressure and disengage rollers 558 from the terminal segments. The predetermined level may be a pressure that does not cause significant leakage of the fluid from conduit 104 and/or a level that is determined to pose minimal or no risk of significant bodily injury.

It will be appreciated that a pig, such as pig 300 (FIG. 6), can be introduced into fluid system 100 when fluid system 100 employs pig coupling 500. In particular, to introduce pig 300 into fluid system 100 through pig coupling 500, end cap 502 can first be disengaged from sleeve 504 as described above. With end cap 502 removed from sleeve 504, sleeve 504 and the interior of fluid conduit 104 is exposed such that a pig 300 can then be inserted within the end of fluid conduit 104. Once pig 300 is inserted into fluid conduit 104, end cap 502 can be coupled to sleeve 504 as described above. With pig 300 positioned within fluid conduit 104 and end cap 502 and sleeve 504 securely engaged, a fluid, such as air, can be introduced into fluid conduit 104 to project pig 300 through fluid system 100 in order to clean and/or remove residual fluid from the interior of fluid conduit 104. Fluid system 100 can include fluid inputs, such as air hoses, at various points for introducing pressurized fluid within fluid system 100. For example, fluid system 100 can include a fluid input adjacent pig coupling 500 to facilitate projection of pig 300 through fluid conduit 104. Similarly, fluid system 100 can also include a fluid input at a location on fluid conduit 104 that is distant from pig coupling 500. The distantly located fluid input can be employed to introduce a pressurized fluid, such as air, into fluid conduit 104 to project pig 300 back to pig coupling 500 after pig 300 has completed cleaning fluid conduit 104, for example. Once pig 300 has finished cleaning or removing residual fluid from fluid conduit 104 and pig 300 has been returned to pig coupling 500, pig 300 can be removed from fluid system 100 simply be removing end cap 502 from sleeve 504 as described above and retrieving pig 300 from fluid conduit 104.

Figure 9A:
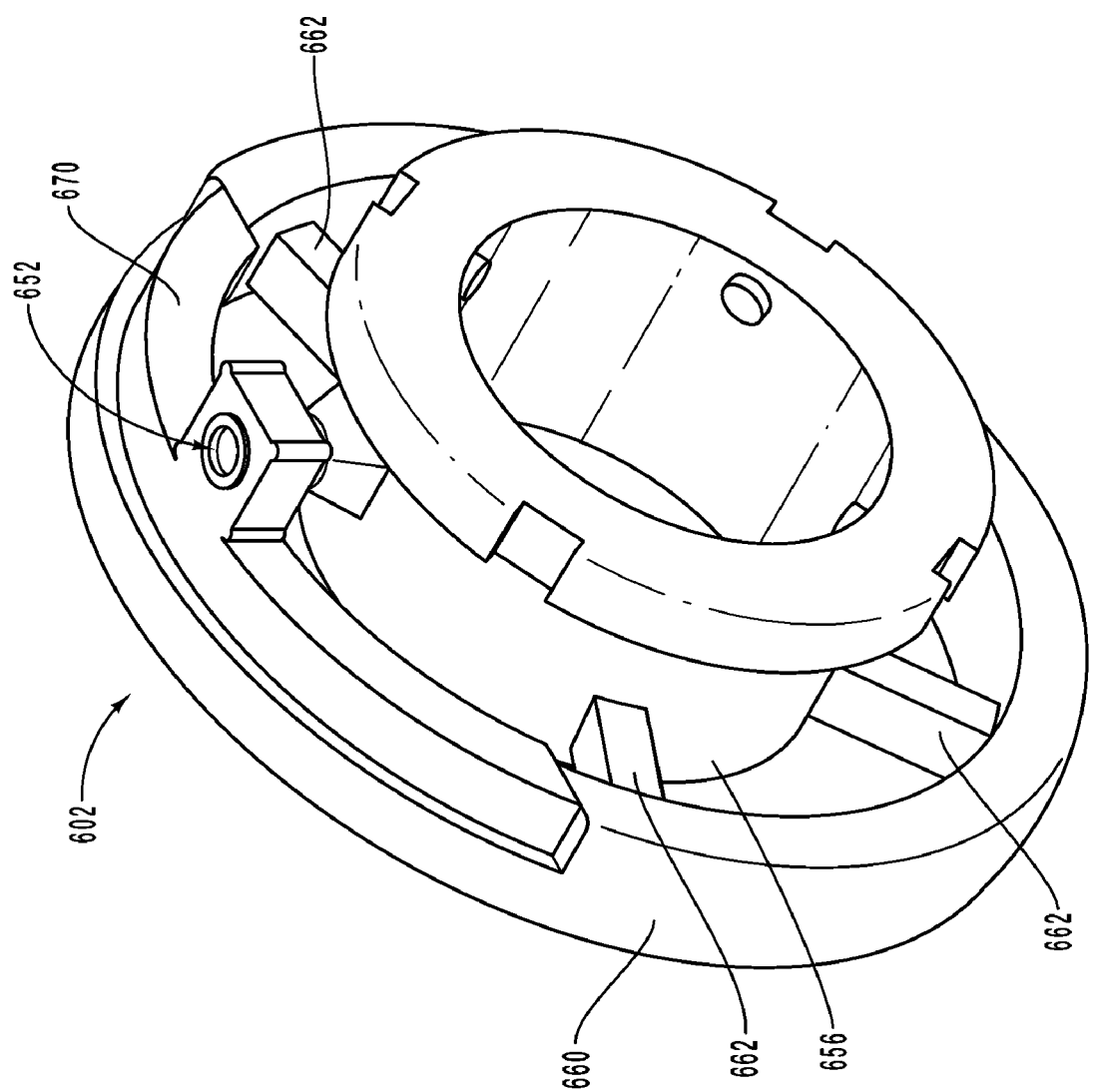
FIG. 9A is a perspective view of another embodiment of a coupling which includes a collar which can be releasably connected to a fluid conduit.

With attention to FIGS. 9A and 9B, illustrated is an exemplary coupling 600 that can be employed as part of fluid system 100. Coupling 600 includes a first coupling member 602 that includes a collar 656 that has a collar handle 660 extending around the entire circumference of collar 656, although as shown in the embodiment illustrated in FIG. 8A, collar handle 660 does not need to extend fully around collar 656. In the embodiment illustrated in FIG. 9A, collar handle 660 is connected to collar 656 by support members 662. Support members 662 can be attached to collar handle 660 and collar 656 in a variety of ways including, but not limited to, welding, brazing, soldering, and the like. Alternatively, collar handle 660, support members 662, and/or collar 656 can be formed as an integral piece, or attached or formed in any other suitable manner.

Coupling 600, illustrated in FIGS. 9A and 9B, further comprises in this embodiment, a pin handle 670, which can be directly or indirectly coupled to the proximate end of pin 652. Pin handle 670 can be slideably or fixedly coupled to pin 652 in a manner that links movement of pin 652 and pin handle 670. For example, as a user exerts a force on pin handle 670 so as to extend pin handle 670 in a radial direction, pin 652 can also be caused to correspondingly move in a radial direction. Pin handle 670 can thus be configured to enable a user to grip pin handle 670 and thereby selectively move pin 652. Movement of pin 652 in this manner may, for example, remove pin 652 from pin recess 650 of sleeve 604 and/or from aperture 664 of collar 656. Similarly, movement of pin 652 in an opposite direction may insert pin 652 into pin aperture 664 and/or pin recess 650.

In some embodiments, pin handle 670 is coupled to the proximate end of pin 652, thus eliminating the need for a pin head 668. Alternatively, pin handle 670 can be coupled to pin head 668, while pin head 668 is in turn is coupled to the proximate end of pin 652. As a result, pin handle 670 can be indirectly coupled to pin 652. In other alternative embodiments, pin 652 and pin handle 670 are formed as a single, integral piece. In any configuration, pin handle 670 can be either directly or indirectly coupled to pin 652 such that inward or outward movement of pin handle 670 correspondingly moves pin 652 inward or outward.

As further illustrated in FIGS. 9A and 9B, pin handle 670 may extend around only portion of the circumference of collar 656. In the illustrated embodiment, for example, pin handle 670 defines an arc of about one hundred twenty (120) degrees. However, the arc defined by pin handle 670 can be larger or smaller than one hundred twenty (120) degrees. For example, in other embodiments, pin handle 670 defines an arc of about sixty (60) degrees, about ninety (90) degrees, or about one hundred eighty (180) degrees. Other aspects, characteristics, functions, and the like, of pin 652, pin recess 650, pin aperture 664, and pin head 668 as described elsewhere herein can apply equally to the present embodiment. For example, pin 652 can, in some embodiments, be biased in a manner similar to that described above with respect to pin 252 (FIGS. 4A-4C).

In the example embodiment, collar handle 660 and pin handle 670 are positioned adjacent to each other. More particularly, a recess of about the shape of pin handle 670 can be formed in collar handle 660, and pin handle 664 can be positioned such that it generally corresponds with the recess. Accordingly, collar handle 660 and pin handle 670 can have a stacked or nested arrangement. In other embodiments, however, collar handle 660 may not be configured to receive pin handle 670, and collar handle 660 and pin handle 670 may merely be placed proximate each other. In either such embodiment, collar handle 660 and pin handle 670 may be positioned such that a user can simultaneously grip both collar handle 660 and pin handle 670 with either one or two hands.

In the illustrated embodiment, a radius from a central, longitudinal axis of collar 656 to collar handle 660 can be definite and unchanging. The radius from the longitudinal axis to pin handle 670 may, however, vary. For example, pin handle 670 may, in its innermost position, have a radius slightly smaller than the fixed radius of collar handle 660, although in other embodiments, pin handle 670 has a radius about equal to, or larger, than collar handle 660. As described herein, the innermost position of pin handle 670 can correspond to a biased position of pin 652.

As discussed above, pin 652 can move with respect to pin aperture 664 and pin recess 650 and may be withdrawn at least partially therefrom. When pin 652 is connected to pin handle 670, this may occur by exerting a force which pulls pin handle 670 away from collar 656. Because pin 652 can be withdrawn from pin aperture 664 and pin recess 650 by pulling pin handle 670 away from collar 656, the distance between pin handle 670 and the central axis of collar 656 can increase. Accordingly, in one embodiment, the distance between the central, longitudinal axis of pin handle 670 can increase to a distance about equal to, or greater than, the radius of collar handle 660. In one embodiment, when pin handle 670 is diametrically aligned within collar handle 660, pin 652 is withdrawn from pin recess 650. In some embodiments, pin handle 670 and pin 652 can be entirely withdrawn from both pin recess 650 and pin aperture 664.

As noted herein, various configurations of a pin aperture are envisioned within the scope of the present invention. In one such configuration, pin recess 650 can comprise a terminal segment of a groove such as terminal segment 214 of groove 208 illustrated in FIG. 3A such that pin recess 650 and terminal segment 214 constitute the same recess within sleeve 604.

Various operational aspects of the coupling embodiment illustrated in FIGS. 9A and 9B are similar to the operational aspects as described herein above with reference to the other pig couplings discussed herein. Accordingly, features of the other pig couplings discussed herein and the coupling of FIGS. 9A and 9B may be interchangeable. For example, with reference to the example embodiment of FIGS. 9A and 9B, for collar 656 to receive a portion of sleeve 604 therein, the distal end of pin shaft 666 of pin 652 can be positioned such that it does not extend past the inner surface of collar 656.

While simultaneously gripping collar handle 660 and pin handle 670, a user can pull pin handle 670 radially away from collar 656 to withdraw the distal end of pin shaft 666 such the distal end of pin shaft 666 does not extend beyond the interior surface of collar 656. With pin 652 retracted from the inner surface of collar 656, the user can reposition collar 656 relative to sleeve 604 using collar handle 660 to engage collar 656 and sleeve 604 as described elsewhere herein. Once collar 656 and sleeve 604 are engaged such that fluid can be introduced into the fluid conduit 104, the user can release pin handle 670, thereby allowing the distal end of pin shaft 666 to be positioned in pin recess 650 of sleeve 604. With the distal end of pin shaft 666 positioned in pin aperture 664 and pin recess 650, axial or translational movement of collar 656 relative to sleeve 604 can be substantially prevented, and collar 656 can be substantially locked in place relative to sleeve 604.

It will be appreciated that a pig, such as pig 300 (FIG. 6), can be introduced into a fluid system when such a fluid system employs coupling 600. In particular, to introduce pig 300 into fluid system 100 (FIG. 1) through coupling 600, collar 656 is first disengaged from sleeve 604 as described above. With collar 656 removed from sleeve 604, sleeve 604 and the interior of fluid conduit 104 are exposed such that pig 300 can then be inserted within the end of fluid conduit 104. Once pig 300 is inserted into fluid conduit 104, collar 656 can be coupled to sleeve 604 as described above. With pig 300 positioned within fluid conduit 104 and collar 656 and sleeve 604 securely engaged, a fluid, such as air, can be introduced into fluid conduit 104 and project pig 300 through fluid system 100 in order to, for example, clean and/or remove residual fluid from the interior of fluid conduit 104. Fluid system 100 can include fluid inputs, such as air hoses, at various points for introducing pressurized fluid within fluid system 100. For example, fluid system 100 can include a fluid input adjacent coupling 600 to facilitate projection of pig 300 through fluid conduit 104. Similarly, fluid system 100 can also include a fluid input at a location on fluid conduit 104 that is distant from coupling 600. The distantly located fluid input can be employed to introduce a pressurized fluid, such as air, into fluid conduit 104 to project pig 300 back to coupling 600 after pig 300 has completed cleaning fluid conduit 104, for example. Once pig 300 has finished cleaning or removing residual fluid from fluid conduit 104 and pig 300 has been returned to coupling 600, pig 300 can be removed from fluid system 100 simply by removing collar 656 from sleeve 604 as described above and retrieving pig 300 from fluid conduit 104.

Figure 10:
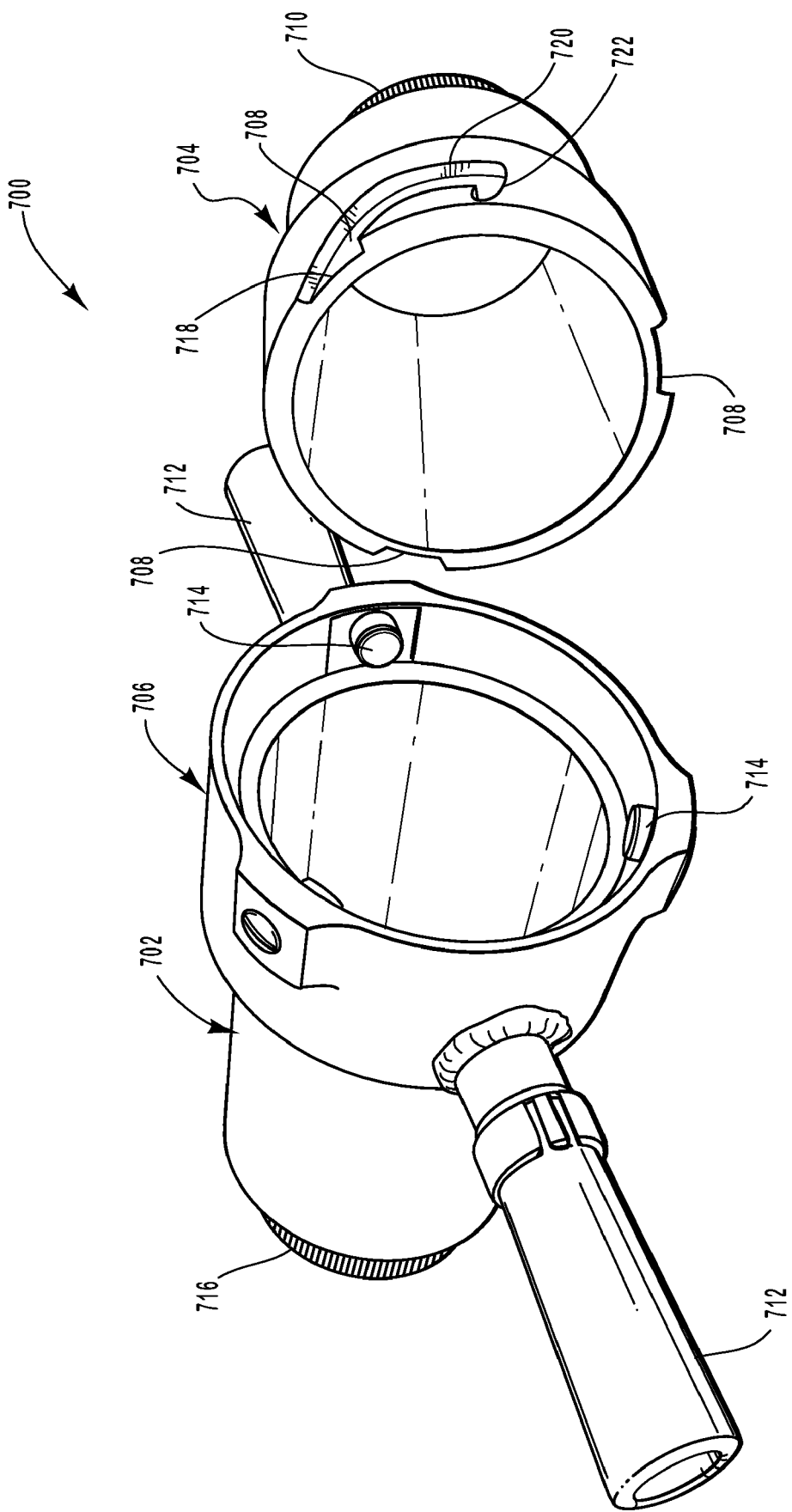
FIG. 10 is a perspective view of an embodiment of a valve assembly which includes a first housing and a second housing that can be releasably connected to each other.

With attention to FIG. 10, illustrated is another exemplary coupling 700 that can be employed as part of fluid system 100 (FIG. 1). As the operational and structural aspects of the illustrated embodiment are similar in many regards to those of other embodiments disclosed herein, the following discussion will focus primarily on selected aspects of the illustrated embodiment.

In particular, coupling 700 includes a first housing 702 and second housing 704 removably joined together by a collar 706. While, in the illustrated embodiment, collar 706 is integral with first housing 702, collar 706 can comprise a component that is, in some embodiments, discrete from both first housing 702 and second housing. Note that the use of coupling 706 is not limited to coupling assembly 700.

With continuing reference to aspects of the first and second housings 702, 704, first housing 702 and second housing 704 each include a corresponding conduit connector 716 and 710, respectively, configured to attach to a fluid conduit 104 (FIG. 1) or other fluid system component, wherein such attachment may be accomplished in a variety of ways including, but not limited to, welding, brazing and soldering. Other exemplary types of conduit connectors 716 and 710 that may be employed include compression fittings and threaded fittings.

As discussed in further detail herein, rotary motion for engaging and disengaging first housing 702 and second housing 704 is imparted by way of handles 712 joined to coupling 706.

In general, the engagement of first housing 702 and second housing 704 is achieved by way of mating pins and grooves, aspects of which are illustrated in FIG. 10. More specifically, coupling 706 includes at least one engagement member, such as pins 714, which are optionally spaced about the circumference of coupling 706 and which can be configured and arranged to engage second housing 704, as discussed herein. In an alternative embodiment discussed herein, pins 714 are replaced with a one or more rollers connected to coupling 716. The use of rollers in place of pins is useful, for example, where coupling 706 is relatively large, and significant frictional forces must otherwise be overcome to operate coupling 706 in the manner described herein.

In correspondence with pins 714, second housing 704 includes, in the illustrated embodiment, at least one groove 708. Grooves 708 can be similar to or interchangeable with the grooves illustrated in FIGS. 3A-3C. In particular, each of three grooves 708 can traverse an arc β of about one hundred twenty (120) degrees about the circumference of second housing 704, although the arc β may be greater or less than one hundred twenty (120) degrees. For example, in the illustrated embodiment, grooves 708 traverse an arc β of about sixty degrees. The width and depth of grooves 708 generally correspond to the diameter and length, respectively, of pins 714. Further, each groove 708 can include an entry segment 718, a circumferential segment 720, and a terminal segment 722 that are structurally and functionally equivalent to entry segment 210, circumferential segment 212, and terminal segment 214 of groove 208. In some alternative embodiments, grooves 708 are defined by a structure that is discrete from, but attached or attachable to, second housing 704. Moreover, the number and arrangement of intermediate segments in a groove, or grooves, may be varied as/if desired as described elsewhere herein.

In general, the engagement of first housing 702 and second housing 704 is effected by positioning each pin 714 in a corresponding groove 708 and causing pins 714 to travel along grooves 708, as suggested in FIG. 3A and described above. More particularly, first housing 702 and second housing 704 are brought together until each pin 714 of coupling 706 is positioned in the entry segment 718 of a corresponding groove 708 of second housing 704. Rotation of second housing 704 may then be initiated by way of handles 712. As a result of the angular orientation of entry segments 718, the initial rotation of first housing 702 causes second housing 704 to be drawn toward first housing 702.

Continued rotation of first housing 702 causes pins 714 to complete their traverse of corresponding entry segments 718, and move into their respective circumferential segments 720. In at least some cases, pins 714 travel to the respective ends of circumferential segments 720. In any event, pins 714 can remain in circumferential segments 720 until such time as a predetermined pressure level is attained in a fluid passageway collectively defined by first housing 702 and second housing 704. Introduction of fluid into the fluid passageway by way of a fluid conduit 104 (FIG. 1) connected to first or second housing 702, 704, increases the pressure within the fluid passageway. The increased pressure within the fluid passageway may, depending on the position of pins 714 prior to pressurization of the fluid passageway, cause a rotary motion of first housing 702. The rotary motion of first housing 702 can therefore cause a corresponding movement of pins 714 along circumferential segment 720 until pins 714 come to rest in terminal segment 722 of groove 708. Further, one or both of first housing 702 and second housing 704 may or may not rotate, depending upon whether one or both such housings 702 and 704 are otherwise restrained from rotational movement during the initial pressurization of the fluid passageway. In yet other embodiments, little or no rotation of first housing 702 or second housing 704 occurs.

Similar to the above discussion relative to FIG. 3B, rotary motion of first housing 702, is facilitated, at least in part, by the geometric relation of circumferential segment 718 and terminal segment 722 (expressed as an offset angle δ in FIG. 3B). Specifically, as the pressure within the fluid passageway causes first housing 702 to rotate relative to second housing 704, the geometry that defines offset angle δ guides each pin 714 from the circumferential segment 720 into its corresponding terminal segment 722.

Once pins 714 are seated thus, the continuing exertion of pressure within the fluid passageway aids in the retention of pins 714 in their corresponding terminal segments 722 (FIG. 3A) and resists motion of pins 714 in the opposite direction, that is, out of their corresponding terminal segments 722. As a result, first housing 702 and second housing 704 of valve 700 essentially cannot be disengaged from each other until the fluid pressure in the fluid passageway has been reduced to a predetermined level. Thus, pins 714 and grooves 708 cooperate with each other, and advantageously employ the line pressure, to ensure a secure connection between first housing 702 and second housing 704 of valve 700. Note that the arrangement and configuration of pins 714 and grooves 708 in this exemplary embodiment, and others disclosed herein, may be varied to function in concert with either positive or negative (vacuum) pressures in the fluid passageway.

It will be appreciated that a pig, such as pig 300 (FIG. 6), can, but need not necessarily, be introduced into fluid system 100 when fluid system 100 employs coupling 700. For example, in some embodiments, coupling 700 is a valve assembly which houses valve components rather than a pig 300. Nevertheless, coupling 700 can also be used for introduction of pig 300 into fluid system 100, in which case first housing 702 is first disengaged from second housing 704 as described herein. With first housing 702 removed from second housing 704, second housing 704 and the interior of fluid conduit 104 is exposed such that pig 300 can then be inserted within the end of fluid conduit 104. Once pig 300 is inserted into fluid conduit 104, first housing 702 can be coupled to second housing 704 as described above. With pig 300 positioned within fluid conduit 104 and first housing 702 and second housing 704 securely engaged, a fluid, such as air, can be introduced into fluid conduit 104 to project pig 300 through fluid system 100 in order to clean and/or remove residual fluid from the interior of fluid conduit 104. Fluid system 100 can include fluid inputs, such as air hoses, at various points for introducing pressurized fluid within fluid system 100. For example, fluid system 100 can include a fluid input adjacent valve 700 to facilitate projection of pig 300 through fluid conduit 104. Similarly, fluid system 100 can also include a fluid input at a location on fluid conduit 104 that is distant from valve 700. The distantly located fluid input can be employed to introduce a pressurized fluid, such as air, into fluid conduit 104 to project pig 300 back to valve 700 after pig 300 has completed cleaning fluid conduit 104, for example. Once pig 300 has finished cleaning or removing residual fluid from fluid conduit 104 and pig 300 has been returned to valve 700, pig 300 can be removed from fluid system 100 simply by removing first housing 702 from second housing 704 as described above and retrieving pig 300 from fluid conduit 104.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A method for introducing a fluid system cleaning device into a pipe, comprising:
   providing a coupling for use in a fluid system, said coupling comprising:
      a sleeve coupled to a pipe, said sleeve having a groove therein, and said sleeve having a recess formed in said groove;
      an end cap having a collar handle and at least one engagement member, said engagement member facilitating selective engagement of said end cap with said sleeve;
   and
      a locking mechanism that selectively engages said sleeve to selectively and substantially prevent axial rotation of said end cap relative to said sleeve in both a first direction and a second direction, wherein said locking mechanism comprises a pin adapted to extend through an aperture in said end cap and into said recess in said sleeve;
   disengaging said locking mechanism from said sleeve;
   rotating said end cap axially relative to said sleeve, and in the first direction, thereby fully disengaging said engagement member from said groove of said sleeve, wherein said engagement member fully disengages from said groove only when said pipe has a line pressure below a predetermined level, and wherein when said pipe has a line pressure at or above said predetermined level, said engagement member is substantially prevented from fully disengaging from said groove;
   inserting a fluid system cleaning device through said sleeve and into said pipe;
   coupling said end cap to said sleeve by positioning said engagement member within said groove of said sleeve and rotating said end cap axially relative to said sleeve, and in the second direction, wherein said second direction is the opposite of said first direction; and
   engaging said locking mechanism with said sleeve to substantially prevent axial rotation of said end cap relative to said sleeve in both the first direction and the second direction.

2. A method as recited in claim 1, wherein said recess is spaced apart from said groove.

3. A method as recited in claim 1, wherein said pin comprises a pin handle to facilitate retraction of said pin from said recess defined by said sleeve.

4. A method as recited in claim 3, wherein said collar handle and said pin handle are configured to enable a user to selectively move said pin handle while simultaneously gripping said collar handle with one hand.

5. A method as recited in claim 1, wherein said sleeve further defines a groove about an outer surface of said sleeve, said groove having an entry segment, a circumferential segment, and a terminal segment.

6. A method as recited in claim 5, wherein said terminal segment of said groove is connected to said intermediate segment and is offset at an acute angle therefrom, said terminal segment being adapted to receive said engagement member therein to substantially prevent axial rotation of said end cap relative to said sleeve.

7. A method for introducing a pig into a pipe, comprising:
providing a coupling for use in a fluid system, said coupling comprising:
  a coupling member, said coupling member including an engagement member;
  a fluid conduit including a sleeve defining a groove, said sleeve being configured to be received at least partially by said coupling member and said groove extending at least partially about a circumference of said sleeve and having a terminal portion notched in a side of said groove, said groove being adapted to receive said engagement member to facilitate engagement of said coupling member and said sleeve, and wherein said terminal portion is configured to receive said engagement member to substantially prevent said coupling member from rotating relative to said fluid conduit;
  a locking member movably connected to said coupling member and adapted to engage said sleeve and substantially prevent axial rotation of said coupling member relative to said sleeve, wherein said locking member is adapted to be selectively removably secured within said terminal segment of said groove;
disengaging said locking member from said sleeve and rotating said coupling member axially relative to said sleeve to fully disengage said engagement member from the sleeve, wherein line pressure above a predetermined amount substantially locks said engagement member in said terminal segment and substantially prevents full disengagement of said engagement member from said groove;
inserting a pig into said fluid conduit;
engaging said coupling member with said sleeve by positioning said engagement member within said groove of said sleeve and rotating said coupling member axially relative to the sleeve until said engagement member is positioned within, adjacent, or beyond said terminal segment of said groove; and
selectively securing said coupling member and said sleeve together by engaging said locking member with said sleeve.

8. A method as recited in claim 7, wherein said locking member comprises a pin.

9. A method as recited in claim 7, wherein said locking member is adapted to be selectively removably received by a recess defined by said sleeve.

10. A method as recited in claim 7, wherein said fluid conduit is a first fluid conduit, and wherein said coupling member further comprises a second fluid conduit coupled thereto for introducing a pressurized fluid into said first fluid conduit, said pressurized fluid having a pressure acting in a direction opposite said line pressure.

11. A method as recited in claim 7, wherein said locking member comprises a pin handle adjacent a collar handle mounted on said coupling member, said pin handle being configured to selectively remove said locking member from within said sleeve.

12. A method as recited in claim 7, wherein said coupling member is an end cap and further comprises an end cap insert disposed at least partially within said end cap.

13. A fluid system comprising:
a coupling adapted to be mounted to a fluid conduit, said coupling including an engagement member and a locking member, and wherein said coupling has a plurality of positions relative to said fluid conduit, including at least:
  a first locked position in which said engagement member is received within a circumferential segment of a groove in said fluid conduit and said locking member is received within a terminal segment of said groove; and
  a second locked position in which said engagement member is received within said terminal segment of said groove, and said locking member is retracted from said groove, wherein said coupling is adapted to rotate from said first locked position to said second locked position when said locking member is retracted from said groove and when line pressure exists in said fluid conduit;
a fluid system cleaning device within said fluid conduit, said fluid system cleaning device being selectively removable from said fluid conduit through said coupling.

14. A fluid system as recited in claim 13, wherein the fluid system further comprises a pig selected from the group consisting of chemical, mechanical, and gelled pigs.

15. A fluid system as recited in claim 13, wherein said coupling further includes a collar handle disposed at least partially around a circumference of said coupling and a movable locking handle adjacent said collar handle, said locking handle being configured to enable a user to hold said collar handle and move said locking handle simultaneously with at least one hand of said user, wherein movement of said locking handle is configured to retract said locking member from said groove.

16. A fluid system as recited in claim 13, wherein said groove is formed in a sleeve of said fluid conduit, and wherein said engagement member is located on a collar of said coupling.

17. A fluid system as recited in claim 13, wherein said terminal segment of said groove is adapted to cooperate with said line pressure within the fluid system to substantially prevent axial rotation of said collar relative to said fluid conduit when said line pressure in said fluid system is above a predetermined level, and wherein said terminal segment is offset at an acute angle from said circumferential segment, and in a direction towards said coupling.

* * * * *